US012567226B2

(12) United States Patent
Zhang et al.

(10) Patent No.: US 12,567,226 B2
(45) Date of Patent: Mar. 3, 2026

(54) METHOD AND DEVICE OF ACQUIRING FEATURE INFORMATION OF DETECTED OBJECT, APPARATUS AND MEDIUM

(71) Applicant: NUCTECH COMPANY LIMITED, Beijing (CN)

(72) Inventors: Li Zhang, Beijing (CN); Zhiqiang Chen, Beijing (CN); Ming Chang, Beijing (CN); Xin Jin, Beijing (CN); Qingping Huang, Beijing (CN); Xiaofei Xu, Beijing (CN); Mingzhi Hong, Beijing (CN); Liguo Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 423 days.

(21) Appl. No.: 18/013,104

(22) PCT Filed: Oct. 8, 2022

(86) PCT No.: PCT/CN2022/123831
§ 371 (c)(1),
(2) Date: Dec. 27, 2022

(87) PCT Pub. No.: WO2023/056940
PCT Pub. Date: Apr. 13, 2023

(65) Prior Publication Data
US 2024/0104884 A1    Mar. 28, 2024

(30) Foreign Application Priority Data
Oct. 8, 2021    (CN) .......................... 202111173973.1

(51) Int. Cl.
*G06V 10/44*        (2022.01)
*G01N 23/04*        (2018.01)
(Continued)

(52) U.S. Cl.
CPC ............. *G06V 10/44* (2022.01); *G01N 23/04* (2013.01); *G06T 7/50* (2017.01); *G06T 7/62* (2017.01); *G06T 7/70* (2017.01); *G06V 2201/07* (2022.01)

(58) Field of Classification Search
None
See application file for complete search history.

(56) References Cited

U.S. PATENT DOCUMENTS 7,233,644 B1    6/2007  Bendahan et al.
7,529,341 B2    5/2009  Schlomka et al.
(Continued)

FOREIGN PATENT DOCUMENTS

CN        1754106 A      3/2006
CN      105021636 A     11/2015
(Continued)

OTHER PUBLICATIONS

International Search Report and Written Opinion for PCT/CN2022/123831 dated Dec. 15, 2022 (9 pages).
(Continued)

*Primary Examiner* — SJ Park
*Assistant Examiner* — Caroline E. Depalma
(74) *Attorney, Agent, or Firm* — Merchant & Gould P.C.

(57) ABSTRACT

A method of acquiring feature information of a detected object is provided, including: controlling the detected object to pass through a detection apparatus; controlling an imaging system to perform radiation scanning on the detected object acquiring a radiation scanning image of the detected object acquiring feature information of the detected object through the radiation scanning image. The detected object includes a first part, a detection part and a second part sequentially in a first direction. The acquiring feature information of the detected object through the radiation scanning image includes: acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

15 Claims, 16 Drawing Sheets

(51) Int. Cl.
| | |
|---|---|
| *G06T 7/50* | (2017.01) |
| *G06T 7/62* | (2017.01) |
| *G06T 7/70* | (2017.01) |

(56) References Cited

U.S. PATENT DOCUMENTS

| | | | |
|---|---|---|---|
| 9,841,387 | B2 | 12/2017 | Yu et al. |
| 2006/0083346 | A1 | 4/2006 | Schlomka et al. |
| 2007/0200566 | A1 | 8/2007 | Clark et al. |
| 2009/0245463 | A1 | 10/2009 | Schlomka et al. |
| 2017/0023494 | A1* | 1/2017 | Yu .......................... G01N 23/04 |

FOREIGN PATENT DOCUMENTS

| | | | |
|---|---|---|---|
| CN | 106373114 A | 2/2017 | |
| CN | 107664774 A | 2/2018 | |
| CN | 213239979 U | 5/2021 | |
| CN | 113030131 A * | 6/2021 | ............. G01N 23/04 |

OTHER PUBLICATIONS

English Translation of International Search Report for PCT/CN2022/123831 dated Dec. 15, 2022 (2 pages).

* cited by examiner

METHOD AND DEVICE OF ACQUIRING FEATURE INFORMATION OF DETECTED OBJECT, APPARATUS AND MEDIUM

CROSS REFERENCE

This application is a Section 371 National Stage Application of International Application No. PCT/CN2022/123831 filed on Oct. 8, 2022, which claims priority to Chinese Patent Application No. 202111173973.1, filed on Oct. 8, 2021, the content of which are incorporated herein by reference in their entirety.

TECHNICAL FIELD

The present disclosure relates to a field of radiation detection technology, and in particular to a method and a device of acquiring feature information of a detected object, an apparatus and a medium.

BACKGROUND

The radiation detection technology is a technology using a ray to detect an interior of an object. The technology may obtain information such as a structure and a density of the object without destroying the object, and is widely used in hospital chest X-ray, security inspection of station and airport, and other scenes.

The existing digital radiography (DR) image analysis is a feature analysis method based on a complete DR or a reconstructed image. A recognition and an analysis of a feature is based on two-dimensional or three-dimensional information, for example, extracting shape information, position information, etc. of a contraband requires two-dimensional information based on the DR image or three-dimensional information of the reconstructed image.

SUMMARY

In view of the above, the present disclosure provides a method and a device of acquiring a feature information of a detected object, an apparatus and a medium.

In an aspect, a method of acquiring a feature information of a detected object is provided, including: controlling the detected object to pass through a detection apparatus, wherein the detection apparatus is configured to scan and detect the detected object; and the detection apparatus includes: a detection channel and an imaging system, the detected object enters and exits the detection apparatus through the detection channel in a first direction, and the imaging system is configured to scan and detect the detected object; controlling the imaging system to perform radiation scanning on the detected object; acquiring a radiation scanning image of the detected object; acquiring a feature information of the detected object through the radiation scanning image, wherein the detected object includes a first part, a detection part and a second part, and in a process of controlling the imaging system to perform radiation scanning on the detected object, the detection part is located between the first part and the second part in the first direction, and wherein the acquiring a feature information of the detected object through the radiation scanning image includes: acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

According to some embodiments, the method further includes: acquiring a volume of the detection part, wherein the acquiring a feature information of the detected object through the radiation scanning image further includes: acquiring an area of a projection of the detection part in the first direction based on the volume of the detection part and the dimension of the detection part in the first direction.

According to some embodiments, the method further includes: acquiring a shape feature information of the projection of the detection part in the first direction; wherein the acquiring a feature information of the detected object through the radiation scanning image further includes: acquiring a feature information of a section of the detection part perpendicular to the first direction based on the area of the projection of the detection part in the first direction and the shape feature information of the projection of the detection part in the first direction.

According to some embodiments, an attenuation characteristic of each of the first part and the second part to a ray emitted by the imaging system is different from an attenuation characteristic of the detection part to the ray emitted by the imaging system.

According to some embodiments, in the radiation scanning image, a gray level of each of the first part and the second part is different from a gray level of the detection part, and wherein the acquiring a first boundary line between the detection part and the first part and a second boundary line between the detection part and the second part through the radiation scanning image includes: determining the first boundary line according to a difference of the gray levels of the detection part and the first part shown in the radiation scanning image; and determining the second boundary line according to a difference of the gray levels of the detection part and the second part shown in the radiation scanning image.

According to some embodiments, a shape of the projection of the detection part in the first direction is circular, and the acquiring a feature information of a section of the detection part perpendicular to the first direction based on the area of the projection of the detection part in the first direction and the shape feature information of the projection of the detection part in the first direction includes: acquiring a radius of the section of the detection part perpendicular to the first direction by using an area calculation formula of a circle according to the area of the projection of the detection part in the first direction; or a shape of the projection of the detection part in the first direction is square, and the acquiring a feature information of a section of the detection part perpendicular to the first direction based on the area of the projection of the detection part in the first direction and the shape feature information of the projection of the detection part in the first direction includes: acquiring a side length of the section of the detection part perpendicular to the first direction by using an area calculation formula of a square according to the area of the projection of the detection part in the first direction.

According to some embodiments, the detection apparatus further includes a posture adjustment structure arranged in the detection channel to adjust a posture of the detected object in the detection channel; wherein the controlling the imaging system to perform radiation scanning on the detected object includes: controlling the detected object to move in the first direction in the detection channel under a driving of the posture adjustment structure; and controlling the imaging system to continuously emit a beam to continuously perform radiation scanning on the detected object during a moving process of the detected object.

According to some embodiments, the imaging system includes a ray source for generating a ray, the ray source is arranged on a side of the detection channel, and the ray at least forms a main beam surface suitable for scanning and detecting the detected object, and wherein the controlling the imaging system to perform radiation scanning on the detected object further includes: adjusting a posture of the detected object so that: in a process of radiation scanning, a detected surface of the detected object is in a same plane as the main beam surface.

According to some embodiments, a ratio of an area value of the projection of the detection part in the first direction to a dimension value of the detection part in the first direction is greater than or equal to 10.

According to some embodiments, the imaging system includes a detector configured to scan and detect the detected object, and a ratio of a dimension of the detector in the first direction to the dimension of the detection part in the first direction is within a range of 1 to 8.

According to some embodiments, before the controlling the imaging system to perform radiation scanning on the detected object, the method further includes: obtaining a posture of the detected object; and controlling a posture adjustment structure to adjust the posture of the detected object based on the obtained posture of the detected object, so that a detected surface of the detected object is in a same plane as the main beam surface of the imaging system.

According to some embodiments, the obtaining a posture of the detected object includes: scanning the detected object by using the imaging system or an additional imaging system to obtain a first image of the detected object; and obtaining the posture of the detected object by analyzing the first image.

In another aspect, a device of acquiring a feature information of a detected object is provided, including: a motion control module configured to control the detected object to pass through a detection apparatus, wherein the detection apparatus is configured to scan and detect the detected object, and the detection apparatus includes: a detection channel and an imaging system, the detected object enters and exits the detection apparatus through the detection channel in a first direction, and the imaging system is configured to scan and detect the detected object; a radiation scanning control module configured to control the imaging system to perform radiation scanning on the detected object; an image acquisition module configured to acquire a radiation scanning image of the detected object; and a feature information acquisition module configured to acquire a feature information of the detected object through the radiation scanning image, wherein the detected object includes a first part, a detection part and a second part; and in a process of controlling the imaging system to perform radiation scanning on the detected object, the detection part is located between the first part and the second part in the first direction, and wherein the acquiring a feature information of the detected object through the radiation scanning image includes: acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

In yet another aspect, an electronic apparatus is provided, including: one or more processors; a storage device configured to store one or more programs, wherein the one or more programs, when being executed by the one or more processors, cause the one or more processors to implement the method described above.

In still another aspect, a computer-readable storage medium having executable instructions thereon is provided, wherein the instructions, when being executed by a processor, cause the processor to implement the method described above.

BRIEF DESCRIPTION OF THE DRAWINGS

The above and other objectives, features and advantages of the present disclosure will be more apparent through the following descriptions of the embodiments of the present disclosure with reference to the accompanying drawings, in which.

Reference Numerals

Figure 1:
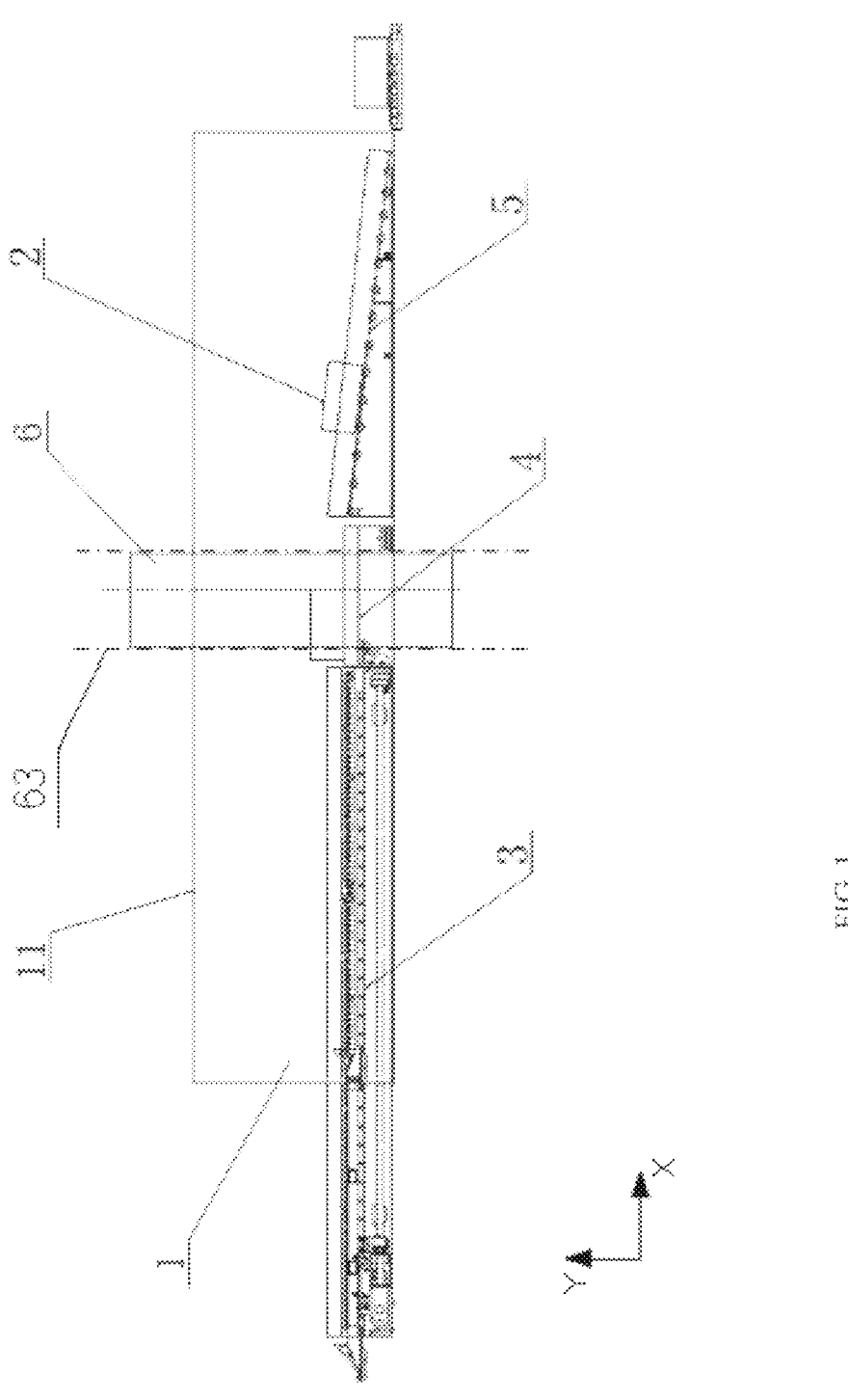
FIG. 1 schematically shows an overall structural diagram of a detection apparatus according to the embodiments of the present disclosure.

1. detection channel; 11. protective cover;
2. detected object; 21. detected surface;
3. first transmission mechanism;
31. driving device;
32. lead screw;
33. first slide rail;
34. sliding mechanism;
35. second slide rail;
36. chute; 4. posture adjustment structure;
41. supporting structure;
411. bearing surface;
42. first adjustment assembly;
421. rack;
422. rotating part;
4221. deflector rod;
4222. deflector head;
42221. weight block; 42222. pushing surface; 42223. guiding surface; 42224. limiting structure;
4223. rotating shaft;
4224. adapter block;
42241. screw sleeve;
4225. bearing;
4226. retaining ring;
4227. first driving unit;
42271. pushing rod; 42272. first motor;
43. second adjustment assembly;
431. supporting plate;
432. second driving unit;
4321. second motor; 4322, lifting rod;
433. hinged seat;
434. joint;
5. second transmission mechanism;
6. imaging system; 61. main beam surface; 62. scanning region; 63. detection region; 6S. ray source; 6T. detector.

DETAILED DESCRIPTION OF EMBODIMENTS

Embodiments of the present disclosure will be described below with reference to the accompanying drawings. However, it should be understood that these descriptions are merely exemplary and are not intended to limit the scope of the present disclosure. In the following detailed descriptions, for ease of explanation, numerous specific details are set forth in order to provide a comprehensive understanding of the embodiments of the present disclosure. However, it is obvious that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms such as "comprising", "including" and the like used herein specify a presence of a feature, a step, an operation and/or a component, but do not preclude a presence or addition of one or more other features, steps, operations or components.

Where expressions similar to "at least one of A, B, and C, etc." are used, they should generally be interpreted in accordance with the meaning of the expression as commonly understood by those skilled in the art (e.g., "a system having at least one of A, B and C" should include, but is not limited to a system having A alone, having B alone, having C alone, having A and B, having A and C, having B and C, and/or having A, B, C, etc.). Terms "first" and "second" are only used for description purposes and may not be understood as indicating or implying relative importance or implicitly indicating the number of indicated technical features. Thus, features defined as "first" and "second" may explicitly or implicitly include one or more said features.

In the embodiments of the present disclosure, unless otherwise specified, X, Y, and Z directions are used to describe a relative positional relationship. It should be understood that they should not be construed as limiting the embodiments of the present disclosure. In general, the X direction may also be referred to as a first direction, the Y direction may also be referred to as a second direction, and the Z direction may also be referred to as a third direction.

The existing technology may not work on DR images of some specific structures. For example, if narrow strip detector (with an aspect ratio of greater than 5) is used to collect DR data, information reflected by a projection map is closer to one-dimensional information. In case that almost only one dimension is left, the existing 2D analysis and extraction and 3D segmentation technologies are difficult to extract effective information.

In the current detection apparatus, the CT scanning technology may be used to detect a detected object. For example, the detected object includes a thin layer structure, especially a "sandwich" type thin layer structure. The thin layer is small in thickness and there being an imaging interference between adjacent layers of the thin layer. The conventional spiral scanning will cause interference of the adjacent layers on a central layer (i.e., the thin layer), that is, a ray penetrates the central layer while penetrating the adjacent layers, thus affecting image resolution and recognition.

The embodiments of the present disclosure provide a method of acquiring feature information of a detected object, including: the detected object is controlled to pass through a detection apparatus, wherein the detection apparatus is configured to scan and detect the detected object, the detection apparatus includes: a detection channel and an imaging system configured to scan and detect the detected object, and the detected object enters and exits the detection apparatus in a first direction through the detection channel; the imaging system is controlled to perform radiation scanning on the detected object; a radiation scanning image of the detected object is acquired; a feature information of the detected object is acquired through the radiation scanning image, wherein the detected object includes a first part, a detection part and a second part; in a process of controlling the imaging system to perform radiation scanning on the detected object, the detection part is located between the first part and the second part in the first direction. The acquiring a feature information of the detected object through the radiation scanning image includes: a first boundary line between the detection part and the first part and a second boundary line between the detection part and the second part are acquired through the radiation scanning image; and a dimension between the first boundary line and the second boundary line in the first direction is calculated to acquire a dimension of the detection part in the first direction.

In the embodiments of the present disclosure, critical dimension information may be extracted on an approximately one-dimensional radiation scanning image, so that feature information of a part of interest (such as the detection part) of the detected object may be deduced.

Figure 13:
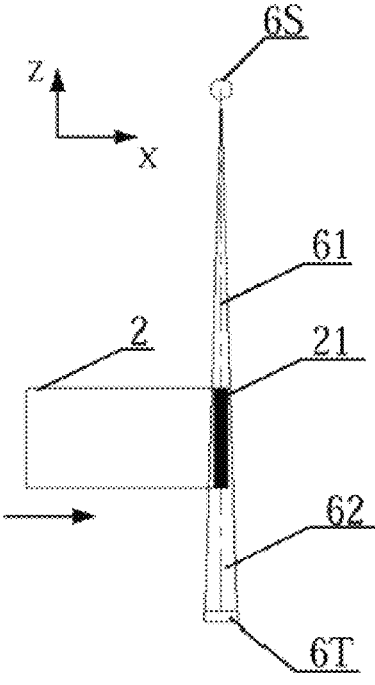
FIG. 13 schematically shows a schematic diagram of a principle of radiation imaging according to the embodiments of the present disclosure.
Figure 21:
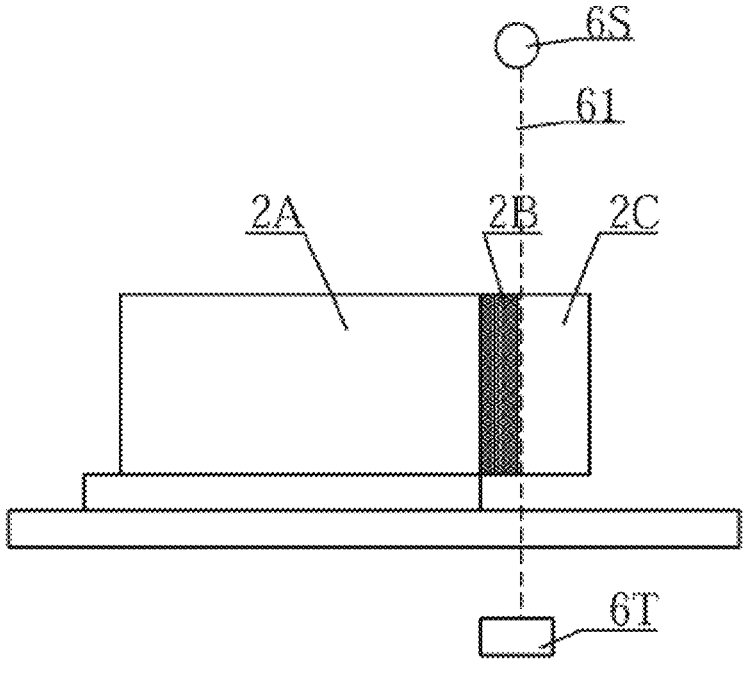
FIG. 21 is a schematic diagram of a detection apparatus according to the embodiments of the present disclosure.

FIG. 1 is a schematic structural diagram of a detection apparatus according to the embodiments of the present disclosure. FIG. 21 is a schematic diagram of a detection apparatus according to the embodiments of the present disclosure. With reference to FIG. 1, FIG. 13, and FIG. 21 in combination, the detection apparatus is used to scan and detect a detected object 2. The detection apparatus provided by the embodiments of the present disclosure includes: a detection channel 1, a first transmission mechanism 3, a posture adjustment structure 4 and an imaging system 6. For example, the detected object enters and exits the detection apparatus through the detection channel 1. The first transmission mechanism 3 is arranged on a side of an entrance of a detection region 63, and the first transmission mechanism is used to transmit the detected object to the detection region. The posture adjustment structure 4 is arranged in the detection region to adjust a posture of the detected object 2 located in the detection region. The imaging system 6 is used to scan and detect the detected object. The imaging system 6 includes: a ray source 6S for generating a ray, wherein the ray source 6S is arranged on a side of the detection channel 1, and the ray at least forms a main beam surface 61 suitable for scanning and detecting the detected object; and a detector 6T used to receive the ray penetrating the detected object, wherein the detector is arranged on the other side of the detection channel 1, the detection region 63 is formed between the ray source and the detector, and the detection region includes an inlet and an outlet. The detected object has a detected surface 21, and the posture adjustment structure 4 may adjust the posture of the detected object 2, so that the detected surface 21 and the main beam surface 61 are in a same plane.

Specifically, the imaging system 6 is used to scan and detect the detected object. The first transmission mechanism 3 is arranged on an entrance side of the imaging system, and is used to convey the detected object to the imaging system. The supporting structure 43 extends in a X direction across a scanning region 62 of the imaging system 6, the supporting structure 43 has a bearing surface 411 suitable for placing the detected object 2. Under a pushing of the first transmission mechanism 3, the detected object 2 may slide in the X direction and pass through the imaging system 6. The first transmission mechanism 3 includes a transmission rack; a driving device 31 fixed on the transmission rack; a lead screw 32 connected with the driving device, and may be driven by the driving device; a first slide rail 33 fixed on the transmission rack, wherein an extension direction of the first slide rail 33 is parallel to an extension direction of the lead screw 32; a sliding mechanism 34 connected with the lead screw which may drive the sliding mechanism to move, so that the sliding mechanism may push the detected object 2 to slide on the first slide rail 33 and the supporting structure 43. Through the structural design described above, the lead screw is used for transmission, and the inspected object may be accurately located in the scanning region 62 of the imaging system of the detection apparatus, effectively solving the problem of insufficient positioning accuracy of a transmission system of the detection apparatus, and meeting requirements of certain products for image detection qualities.

In the embodiments of the present disclosure, after the detected object is transmitted to a designated position through the first transmission mechanism and the supporting structure, the scanning and detection are performed by the imaging system. Specifically, the first transmission mechanism includes the driving device, the lead screw, the sliding mechanism, the first slide rail and other structures. The driving device drives the lead screw to rotate, and the lead screw may drive the sliding mechanism to move after rotating. The inspected object is placed on the first slide rail. When the sliding mechanism is driven by the lead screw, the sliding mechanism may push the inspected object to move on the first slide rail. An end of the first slide rail is connected to the supporting structure, an end of the supporting structure is matched with the end of the first slide rail, while the other end of the supporting structure passes through the scanning region of the imaging system. The sliding mechanism, under a driving of the driving device, may extend out of the first slide rail to push the detected object to slide on the supporting structure, and accurately position the detected object on the scanning region of the imaging system, thus improving a positioning accuracy of the transmission system of the detection apparatus.

It should be noted that the "designated position" described above means that at the "designated position", a part to be detected of the detected object is just located on the scanning region (i.e., the main beam surface of the imaging system) of the imaging system for scanning and detecting. The meaning of "designated position" in the present disclosure may be understood according to the content here, and will not be repeated later.

It should also be noted that in the embodiments of the present disclosure, the first transmission mechanism and the supporting structure are arranged in sequence in a transmission direction of the detected object. At this time, there may be a gap of a certain width between the first transmission mechanism and the supporting structure. It should be understood that the gap is allowed to exist, as long as the inspected object may pass through the gap smoothly in a process of being transmitted from the first transmission mechanism to the supporting structure.

In another embodiment of the present disclosure, the first transmission mechanism and the supporting structure may also be an integrated structure, that is, the first transmission mechanism and the supporting structure belong to different sections of a same transmission device. For example, when the "same transmission device" is a transmission belt, the first transmission mechanism includes a front half of the transmission belt, and the supporting structure includes a back half of the conv transmission belt. At this time, the detected object may also be accurately positioned on the scanning region of the imaging system. It should be understood that in the embodiments of the present disclosure, the "transmission belt" is taken as an example only to facilitate the understanding of the solution, rather than limiting the transmission form of the first transmission mechanism and supporting structure.

For example, in the embodiments of the present disclosure, the imaging system 6 may include at least one of a CT imaging system and a DR imaging system for scanning and detecting the detected object 2. For example, the CT imaging system includes a ray source, a detector, and other structures. The CT imaging is to scan a layer having a certain thickness in the detected object with an X-ray beam, the detector receives the X-ray penetrating the layer and converts the X-ray into visible light, a photoelectric converter is used to convert the visible light to an electrical signal, and an analog/digital converter is used to convert the electrical signal into a digital signal, and a CT image is obtained after computer processing. The CT imaging has a high resolution and a good spatial resolution, thus obtaining clear three-dimensional images. For example, the DR imaging system includes an electronic cassette, a scanning controller, an image monitor, and other structures. The DR imaging is to directly convert X-ray photons into a digital image through the electronic cassette, that is, to obtain a DR image. The DR imaging has characteristics of high speed, low radiation, high spatial resolution and low noise rate.

In order to ensure an entirety and accuracy of imaging, it is necessary to ensure that a detected surface and the main beam surface are in the same plane. An axis parallel to the main beam surface is defined as the Z axis, and an axis parallel to an advancing direction of the detected object is defined as the X axis. The Y axis is defined to be perpendicular to both the X axis and the Z axis. The scanning region formed by rays emitted by the ray source is approximately conical.

In the embodiments of the present disclosure, the posture adjustment structure is used to adjust the detected object 2 to a preset detection position.

In a plane where the main beam surface is located, a relative position of the imaging system and the detected object may be changed, so that the imaging system may scan and detect the detected object at a plurality of angles.

For example, the ray source and the detector in the imaging system are stationary, and the detected object rotates along the X axis; or the ray source and the detector in the imaging system rotate around an axis of the detection channel, and the detected object is stationary; or the ray source and the detector in the imaging system rotate around the axis of the detection channel, and the detected object rotates along the X axis.

Certainly, an imaging system may include a plurality of ray sources and a plurality of detectors. The plurality of ray sources are respectively arranged opposite to the plurality of detectors. A ray source and a detector form a source detection assembly, wherein a main beam surface is formed in each source detection assembly, and main beam surfaces of the plurality of source detection assemblies are located in the same plane.

It should be noted that a source detection assembly at least includes a ray source and a detector, that is, the source detection assembly may be composed of a ray source and a detector, or the source detection assembly may be composed of a ray source and a plurality of detectors.

The posture adjustment structure may adjust the posture of the detected object, so that the detected surface and the main beam surfaces of the plurality of source detection assemblies are in the same plane.

In some exemplary embodiments of the present disclosure, in a plane where the main beam surface is located, the relative position of the imaging system and the detected object may be changed, so that the imaging system may scan and detect the detected object at a plurality of angles.

In some exemplary embodiments of the present disclosure, the imaging system may rotate relative to the detected object in the plane where the main beam surface is located.

In some exemplary embodiments of the present disclosure, the imaging system includes a plurality of ray sources and a plurality of detectors, the plurality of ray sources are respectively arranged opposite to the plurality of detectors to form a plurality of source detection assemblies, a main beam surface is formed in each source detection assembly, and main beam surfaces of the plurality of source detection assemblies are located in the same plane. The posture adjustment structure may adjust the posture of the detected object, so that the detected surface and the main beam surfaces of the plurality of source detection assemblies are in the same plane.

In some exemplary embodiments of the present disclosure, the posture adjustment structure may move the detected object in a first direction, so that the detected object has a plurality of detected surface s, wherein the first direction is parallel to the transmission direction of the detected object.

In some exemplary embodiments of the present disclosure, for each detected surface, the posture adjustment structure may position the detected object, so that the detected surface and the main beam surface are in the same plane.

In some exemplary embodiments of the present disclosure, the detected object includes a detection part, the detection part has the detected surface, and a ratio of an area value of a projection of the detection part in the first direction to a dimension value of the detection part in the first direction is greater than or equal to 10.

In some exemplary embodiments of the present disclosure, a ratio of a dimension of the detector in the first direction to a dimension of the detection part in the first direction is within a range of 1 to 8. That is, the detector only needs to cover the detection part of the detected object. In this way, in the embodiments of the present disclosure, the detector with narrow width and high resolution may be selected. For example, a width of the detector (that is, the dimension in the first direction) may be less than 100 mm, and a pixel size of the detector may be less than 500 microns. In the embodiments of the present disclosure, the detector with narrow width and high resolution may be selected, which is conducive to reducing a cost.

In some exemplary embodiments of the present disclosure, a focus size of the ray source is less than or equal to 1 mm. In other words, the ray source having a smaller focus size may be selected to ensure the spatial resolution.

Figure 20:
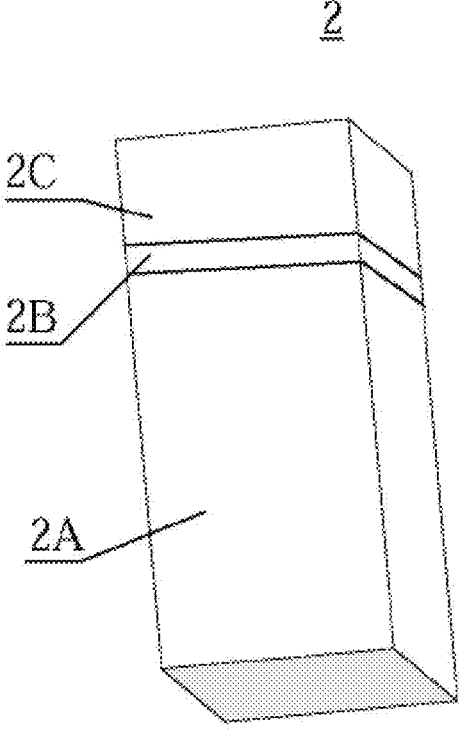
FIG. 20 schematically shows a perspective view of a detected object according to some exemplary embodiments of the present disclosure.

It may be understood that in the field of radiation detection, the radiation imaging technology may image a damage condition inside an object, which is convenient for an inspector to judge. In a detected object, a detection dimension of a region to be detected may be small. For example, in the embodiments of the present disclosure, the detected object may include an article such as a lithium battery. In a process of detecting the lithium battery, a thin film or an adhesive layer of the lithium battery is required to be detected. However, a thickness of the film or the adhesive layer of the lithium battery is small. With reference to FIG. 20 and FIG. 21, for example, the detected object 2 such as the lithium battery may include a first part 2A, a detection part 2B and a second part 2C. For example, the detection part 2B may be the thin film or the adhesive layer, which belongs to a thin layer structure. That is, the detected object 2 has a "sandwich" type thin layer structure, wherein the detection part 2B is a thin layer structure located in the middle, and the first part 2A and the second part 2C are front and rear layers located on two sides.

It should be noted that in the embodiments of the present disclosure, the thin layer structure may be understood as that a thickness of the structure is not on a same order of magnitude as a cross-sectional area of the structure. For example, a ratio of an area value of a projection of the thin layer structure in a thickness direction of the thin layer structure to a dimension value of the thin layer structure in the thickness direction is greater than or equal to 10.

The embodiments of the present disclosure provide a posture adjustment structure, including: a base extending in the first direction, and the base has a bearing surface suitable for placing the detected object; a first adjustment assembly arranged below the base, wherein the first adjustment assembly includes a rack which may slide in the first direction relative to the base; a deflector rod, which may be rotatably arranged on the rack with the Y axis as a rotation axis; a deflector head arranged on the deflector rod, wherein the deflector head, under a driving of the deflector rod, may be abutted on the detected object to drive the detected object to deflect around the second direction on the bearing surface, and/or drive the detected object to move in the first direction on the bearing surface.

The posture adjustment structure provided by the embodiments of the present disclosure may be used to adjust a motion posture of a transmitted object on a production line, and may also be used in the field of radiation detection to adjust the detected object to a preset detection position. When being applied in the field of radiation detection, the posture adjustment structure in the present disclosure is required to be used in at least the following scenarios, and a description of the scenarios is as follows:

It may be understood that in the field of radiation detection, the radiation imaging technology may be used to image a damage condition inside an object, which facilitates an inspector to judge. In a detected object, a detection dimension of a region to be detected may be small. For example, in a process of detecting lithium battery, a thin film or an adhesive layer of the lithium battery needs to be detected. However, a thickness of the film or adhesive layer of lithium battery is small. As shown in FIG. 4, FIG. 5, FIG. 20, and FIG. 21, a region represented by 2B in the above-mentioned drawings is the thin film or the adhesive layer described above, and an axis parallel to the main beam surface 61 is defined as the Z-axis, an axis parallel to an advancing direction of the detected object 2 is defined as the X axis, and the Y axis is defined to be perpendicular to both the X axis and the Z axis. The scanning region 62 formed by rays emitted by the ray source 6S is approximately conical. In an actual detection, the inventor found that when a detected layer (the detected surface parallel to the main beam surface) of the thin film or the adhesive layer is deflected in a third direction or in a second direction, the detected layer may be deflected out of the scanning region due to an influence of a shape of the scanning region. When the detected layer offsets out of the scanning region, a part of the detected layer may not be detected, leading to a problem of detection inaccuracy.

In the embodiments of the present disclosure, for the detected object having the thin layer structure, the thin layer to be detected is accurately positioned, so that the thin layer to be detected may be positioned in the main beam surface, and scanning detection such as circular orbit scanning may be performed on a designated thin layer. During an imaging process, it may be ensured that the ray only penetrates a central layer (i.e., the thin layer structure 2B), or penetrates the front and rear layers as little as possible, thus improving an image accuracy.

For example, with reference to FIG. 6 to FIG. 19, the posture adjustment structure 4 includes a first adjustment assembly 42 arranged on the first transmission mechanism 3. The first adjustment assembly 42 includes: a deflector rod 4221, which is rotatably arranged on the rack 421 with the Y axis as the rotation axis; a deflector head 4222 arranged on the deflector rod 4221, wherein the deflector head 4222, under a driving of the deflector rod 4221, may be abutted on the detected object 2 to drive the detected object 2 to deflect around the Y direction on the bearing surface 411, and/or drive the detected object 2 to move in the X direction on the bearing surface 411.

The supporting structure 41 in the embodiments of the present disclosure extends in the X direction, and a plurality of detected objects 2 may be placed on the bearing surface 411 of the supporting structure 41 at intervals. The supporting structure 41 may be a common production transmission line, such as, a production console, a placement assembly line, etc.

The supporting structure 41 is designed as an assembly line type supporting frame, which includes two oppositely arranged frame bodies, and the first adjustment assembly is arranged between the two frame bodies. A cross section of the two frame bodies is L-shaped, and thus include a horizontal supporting arm and a vertical supporting arm. A supporting rail is installed on the horizontal supporting arm. An upper surface of the supporting rail is configured as the bearing surface 411. The detected object 2 crosses two supporting rails and is supported by the bearing surface 411 of the supporting rails, so that the detected object 2 is placed.

The detected object 2 in the embodiments of the present disclosure may be the lithium battery. When the lithium battery is placed on the bearing surface 411, it is necessary to ensure that the plane where the thickness of the adhesive layer or the film layer is located is substantially oriented toward the ray source of the imaging system 6.

In the embodiments of the present disclosure, the first adjustment assembly 42 further includes a rotating part 422. The rotating part 422 is rotatably arranged on the rack 421 with the Y axis as the rotating axis. Under a driving of an external force, the rotating part 422 is used to drive the detected object 2 to deflect around the Y direction on the bearing surface 411, and under a driving of the rack 421, the rotating part 422 may drive the detected object 2 to move in the X direction.

It may be understood that there are a plurality of structural forms of the rotating part 422. The rotating part 422 in the embodiments of the present disclosure adopts a form of combining the deflector rod 4221 with the deflector head 4222, and a specific structure is as follows:

A deflector rod 4221 is installed on the rack 421, and the deflector rod 4221 is rotatably arranged on the rack 421 with the Y axis as the rotation axis. On the rack 421, a rotating shaft 4223 is arranged in the Y direction, and the rotating shaft 4223 is fixed on the rack 421. Furthermore, the rack 421 is provided with a frame transversely arranged between the frame bodies, and the rotating shaft 4223 is arranged at a center of an upper end surface of the frame described above. The arrangement at the center may ensure that lengths of rotating arms of the deflector rod 4221 arranged on the rotating shaft 4223 to be consistent, which may facilitate a subsequent adjustment of a deflection angle.

It may be understood that in order to enable the deflector rod 4221 to be rotatably installed on the rotating shaft 4223, in the embodiments of the present disclosure, the deflector rod 4221 is arranged on an adapter block 4224, and two deflector rods 4221 are respectively oppositely arranged on the adapter block 4224. A mounting hole is machined in a middle of the adapter block 4224. A bearing 4225 and a retaining ring 4226 limiting the bearing 4225 from escaping from the mounting hole are embedded in the mounting hole. The rotating shaft 4223 is fitted and installed in the bearing 4225 to realize a rotation of the adapter block 4224 around the rotating shaft 4223 and to drive the deflector rod 4221 to rotate around the Y direction.

The first adjustment assembly 42 in the embodiments of the present disclosure further includes a deflector head 4222 arranged on the deflector rod 4221. The deflector head 4222, under a driving of the deflector rod 4221, may be abutted on the detected object 2 to drive the detected object 2 to deflect around the Y direction on the bearing surface 411, and/or drive the detected object 2 to move in the X direction on the bearing surface 411.

In the embodiments of the present disclosure, deflector heads 4222 are respectively installed at end portions of two deflector rods 4221. The deflector heads 4222 protrude from the bearing surface 411, and may be abutted on an end surface of the detected object 2 facing away from a movement direction when the rack 421 is moving. In addition, in order to deflect the detected object 2, an abutting position of the deflector head 4222 is deflected from a center position of the end surface.

It may be understood that a process of the deflector head 4222 driving the detected object 2 to deflect around the Y direction on the bearing surface 411 is as follows. When the rack 421 is driven by an external force to move to the detected object 2, if it is detected that the detected object 2 is deflected in the Y direction, the adapter block 4224 rotates to drive the deflector rod 4221 to rotate, so that the deflector head 4222 on the deflector rod 4221 acts on the detected object 2, and the deflector head 4222 pushes the detected object 2 to rotate, thus correcting the deflection of the detected object 2. In the detection method of determining whether the detected object 2 is deflected in the Y direction, a position sensor may be used to detect a spatial position coordinate of the current detected object 2 to determine whether the current detected object 2 is deflected. A detection result of a preceding detected object 2 may also be used for judgement. If the preceding detected object 2 is deflected, it is necessary to perform an deflection adjustment on the current detected object 2.

It may be understood that after a deflection correction of the detected object 2 is completed, when the rack 421 continues to move in the X direction, the deflector head 4222 may push the detected object 2 to move in the X direction to enter a next detection step.

It may be understood that in some embodiments, under the driving of the deflector rod 4221, the deflector head 4222 may only be abutted on the detected object 2 to drive the detected object 2 to deflect around the Y direction on the bearing surface 411. The movement of the detected object 2 in the X direction may be driven by other structures.

It may be understood that in some embodiments, the rotating part 422 may also be a combination of a rotary table and a lifting structure. Specifically, the rotary table is arranged on the lifting structure. The rotary table may perform a lifting movement in the Z direction under a driving of the lifting structure. When the rotary table is lifting, the detected object 2 on the supporting structure 41 may be carried. The rotary table may be rotatably arranged on the lifting structure at the same time. Under a driving of an external force, the rotary table carrying the inspected object 2 may rotate in the Y direction. Furthermore, the lifting structure is fixed on the rack 421. Under a driving of the rack 421, the rotary table may also move in the X direction, thereby realizing a deflection adjustment of the detected object 2 in the Y direction.

Referring to FIG. 6 to FIG. 12, in the embodiments of the present disclosure, the first adjustment assembly 42 further includes a first driving unit 4227, which is used to drive the adapter block 4224 to rotate. Specifically, the first driving unit 4227 includes a pushing rod 42271 that may move toward or away from the adapter block 4224, and a first motor 42272. One end of the pushing rod 42271 is movably connected to the adapter block 4224, and the other end is connected to the first motor 42272. In order to ensure that the pushing rod 42271 may push the adapter block 4224 to rotate around the rotating shaft 4223, the pushing rod 42271 is required to be connected to an end of the adapter block 4224 away from the rotating shaft 4223, so that a rotating torque is formed when being pushed.

The first motor 42272 is arranged on the rack 421, and the first motor 42272 rotates to drive the pushing rod 42271 to rotate. An end surface of the adapter block 4224 facing the pushing rod 42271 is provided with a screw sleeve 42241, and the pushing rod 42271 is provided with a thread section matching with the screw sleeve 42241. When the pushing rod 42271 rotates, the thread section rotates in the screw sleeve 42241, driving the adapter block 4224 to rotate.

It may be understood that there are two sets of first driving unit 4227 in the embodiments of the present disclosure, and the two sets of first driving unit 4227 are arranged symmetrically with respect to the rotating shaft 4223. When the two sets of first driving units 4227 drive the deflector rod 4221 to rotate, the pushing rod 42271 of one of the first driving units 4227 moves toward the deflector rod 4221, and the pushing rod 42271 of the other of the first driving units 4227 moves away from the deflector rod 4221.

It may be understood that in some other embodiments, the number of first driving units 4227 may be one set. When there is one set of first driving unit 4227, the pushing rod 42271 and the adapter block 4224 may realize a reciprocating swing of the deflector rod 4221 around the Y direction through an adjustment manner of a universal joint matching a telescopic rod.

It may be understood that in some embodiments, the number of deflector heads 4222 installed on the deflector rod 4221 may be multiple, so as to be suitable for adjusting deflecting positions.

As described above, when the rack 421 is moving, the embodiments of the present disclosure has a function of pushing the detected object 2 to move in the X direction through the deflector head 4222, and the detected object 2 is placed on the supporting structure 41 at intervals. When the rack 421 drives a preceding detected object 2 in the X direction to move to a next process, the rack 421 may be driven to move backward, and the deflector head 4222 may be abutted on an end face of a detected object 2 facing away from the movement direction again, so that the detected object 2 is pushed to move in the X direction. In order to realize a continuous transmission of the detected object 2 on the supporting structure 41 by the first adjustment assembly 42, the deflector head 4222 is also required to be rotatably arranged on the deflector rod 4221 in the embodiments of the present disclosure. The deflector head 4222 may rotate around the axis direction of the deflector rod 4221, and is configured as an eccentric structure, wherein the deflector head 4222 has a first position extending out of the bearing surface 411 under a driving of an eccentric force and a second position turning to a lower portion of the bearing surface 411 under an action of an external force. When the rack 421 moves in the X direction, the deflector head 4222 is used to push the detected object 2 to move in the X direction when the deflector head 4222 is located at the first position.

The deflector head 4222 includes: a pushing surface 42222 suitable for abutting on the detected object 2; and a guiding surface 42223 arranged at an angle with respect to the pushing surface 42222 and suitable for receiving an external force. In the embodiment, the deflector head 4222 is in a shape of right triangle. The pushing surface 42222 corresponds to a plane where a right side is located, and the guiding surface 42223 corresponds to a plane where a bevel side is located. A limiting structure 42224 is used to limit the rotation of the deflector head 4222 when the deflector head 4222 moves to the first position. When the rack 421 moves in a negative direction of the X axis, the guiding surface 42223 hits the detected object 2 to drive the deflector head 4222 to the second position. The limiting structure 42224 is a limit block arranged at the guiding surface 42223 and protruding from the guiding surface 42223.

In order to ensure that a center of the deflector head 4222 does not coincide with a rotation center, a weight block 42221 is provided on the deflector head 4222 to adjust an eccentric distance of the deflector head 4222, so that the pushing surface 42222 is parallel to the YZ plane at the first position. The parallel arrangement of the pushing surface 42222 with the YZ plane may ensure that when the pushing surface 42222 pushes the detected object 2, the pushing surface 42222 is attached to the detected object 2, thus ensuring a smooth movement of the detected object 2 on the bearing surface 411.

In the embodiments of the present disclosure, a feeding manner of the detected object 2 is to transmit one detected object 2 at a feeding point of the supporting structure 41 by a certain time interval. However, an interval distance between the feeding point of the detected object 2 and the scanning region is large, resulting in a large forward or backward travel of the rack 421 between the feeding point and the scanning region, which increases a transmission time of the detected object 2. In order to solve the problem described above, in the embodiments of the present disclosure, the deflector head 4222 is rotatably arranged at the end of the rack 421 away from the first adjustment assembly 42, and the deflector head 4222 is arranged at an interval with the deflector head 4222 in the first adjustment assembly in the X direction. A distance of the above-mentioned interval may be half of the interval distance between the feeding point and the scanning region. When the rack 421 moves backward by one interval distance and then moves forward again, the rack 421 may drive two detected objects 2 to move forward once, improving a transmission efficiency of the detected objects 2.

It may be understood that when the number of the feeding detected object 2 is plural once, a plurality of deflector heads 4222 may be adaptively arranged in the X direction to improve the transmission efficiency of the detected objects 2.

As described above, in the detected layer of the thin film or the adhesive layer, there is a detected surface 21 parallel to the main beam surface 61. When a deflection occurs in the Z direction, the detected layer may also be deflected out of the scanning region duo to the influence of the shape of the scanning region. Based on this, the embodiments of the present disclosure further include a second adjustment assembly 43. When the detected object 2 completes the deflection correction in the Y direction on the first adjustment assembly 42, the detected object 2 enters the second adjustment assembly 43 under the pushing of the deflector head 4222.

In the embodiments of the present disclosure, the detection apparatus further includes a second slide rail 35 fixed on the rack 421 and is used to support the sliding mechanism 34. The sliding mechanism 34 is provided with a chute 36 for matching with the second slide rail 35, and the sliding mechanism 34 may slide on the second slide rail 35 through the chute 36. At the same time, a cooperation between the chute 36 and the second slide rail 35 plays a supporting role on the sliding mechanism 34, and increases a stability of the sliding mechanism 34 when moving. In addition, an extension direction of the second slide rail 35 is parallel to the extension direction of the lead screw 32. When the lead screw 32 drives the sliding mechanism 34 to move, the second slide rail 35 may cooperate with the lead screw 32 to guide a moving direction of the sliding mechanism 34 so as to ensure that a moving direction of the detected object 2 pushed by the sliding mechanism 34 does not deflect. For example, the second slide rail 35 may be a linear guide rail parallel to the extension direction of the lead screw 32.

Figure 3:
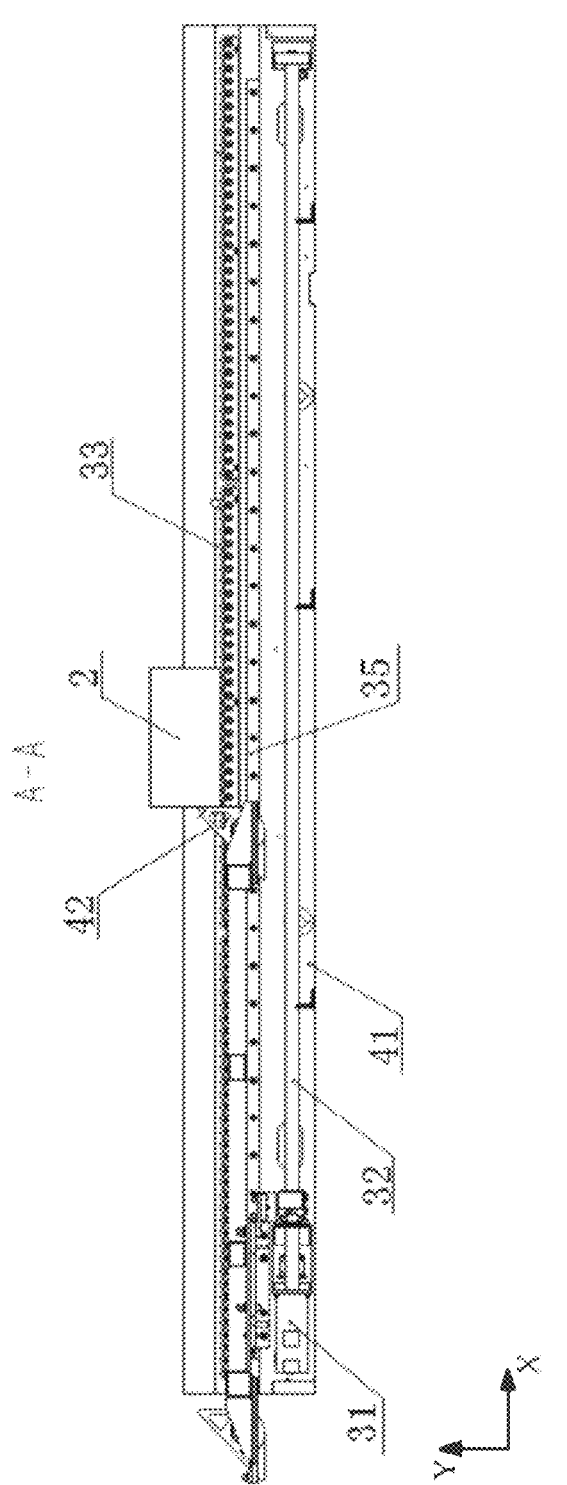
FIG. 3 schematically shows a sectional view of a plane A-A in FIG. 2.
Figure 4:
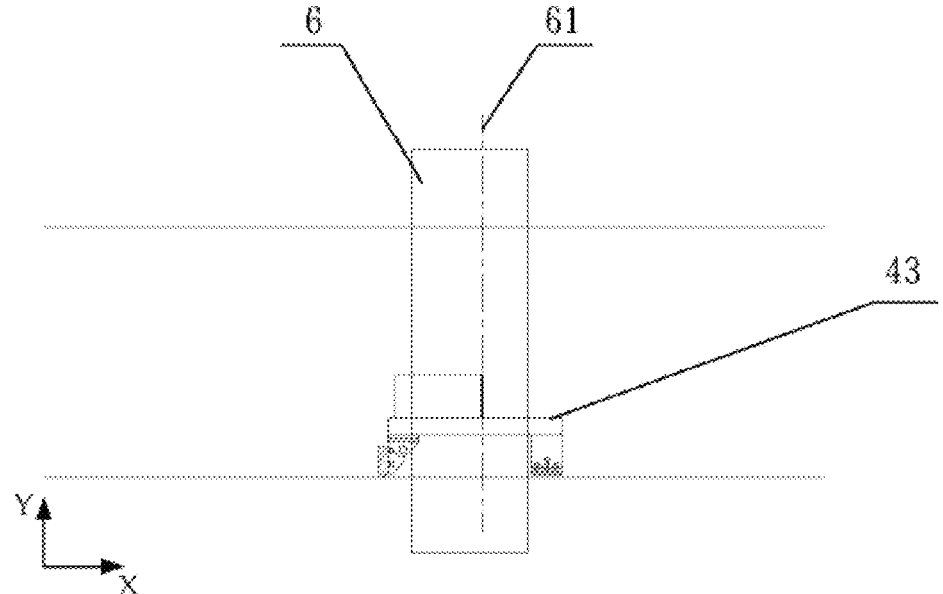
FIG. 4 schematically shows a diagram of an adjustment manner of a second adjustment assembly according to the embodiments of the present disclosure.
Figure 5:
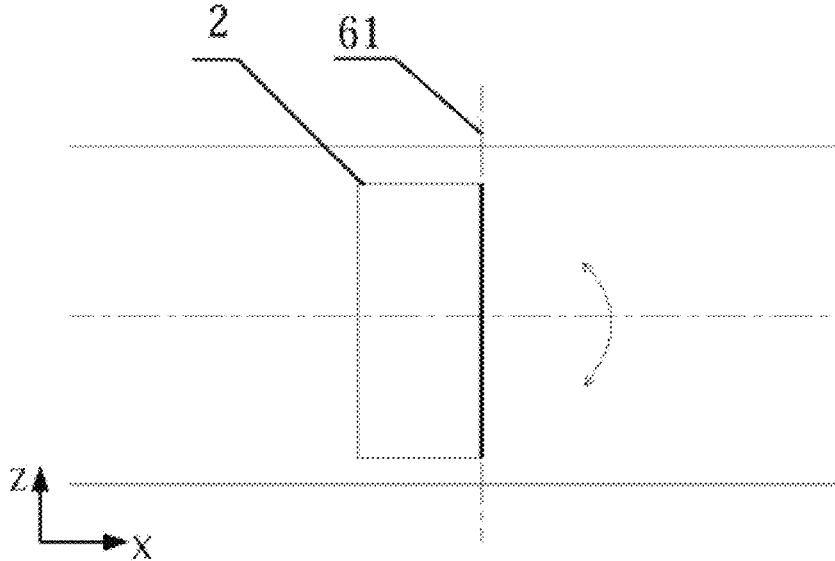
FIG. 5 schematically shows a diagram of an adjustment manner of a first adjustment assembly according to the embodiments of the present disclosure.
Figure 6:
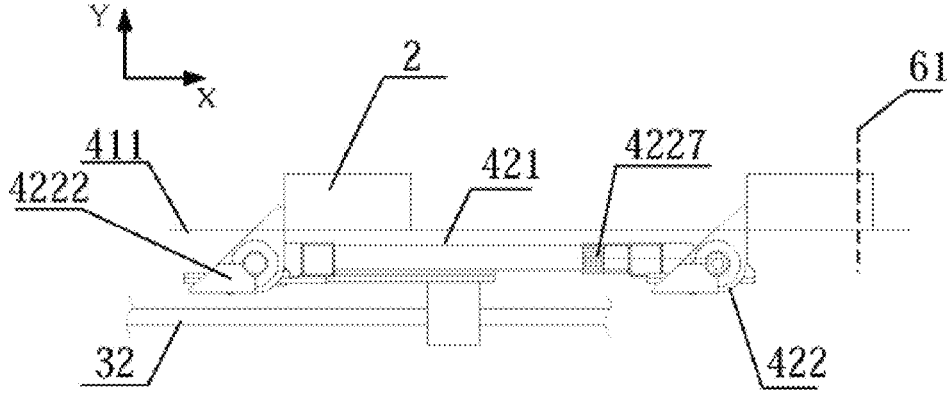
FIG. 6 schematically shows a front view of a first adjustment assembly according to the embodiments of the present disclosure.
Figure 7:
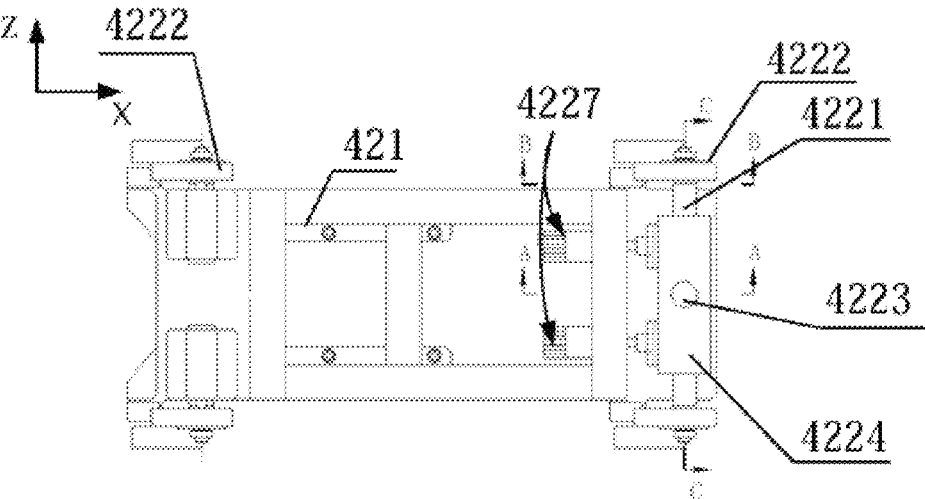
FIG. 7 schematically shows a top view of a first adjustment assembly according to the embodiments of the present disclosure.
Figure 8:
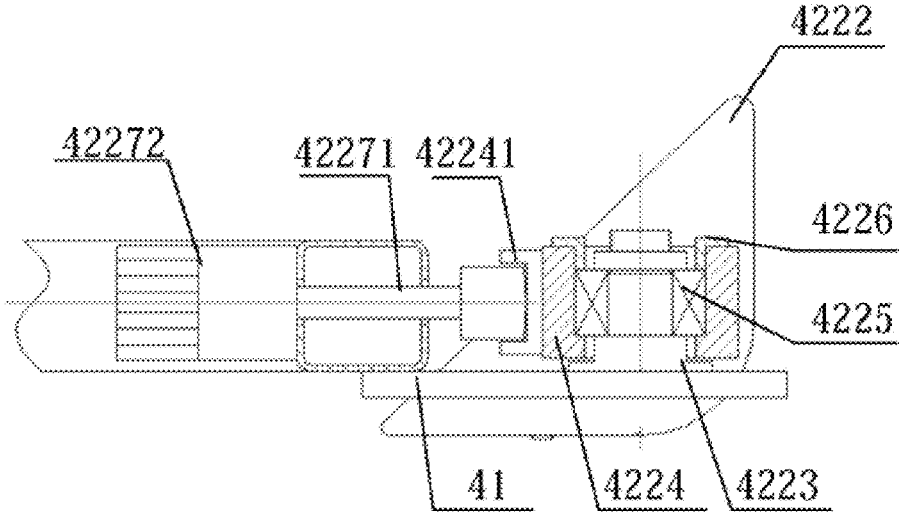
FIG. 8 schematically shows a sectional view at A-A in FIG. 7.
Figure 9:
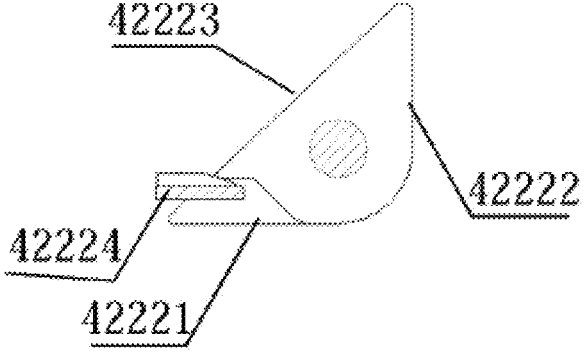
FIG. 9 schematically shows a sectional view at B-B in FIG. 7.
Figure 10:
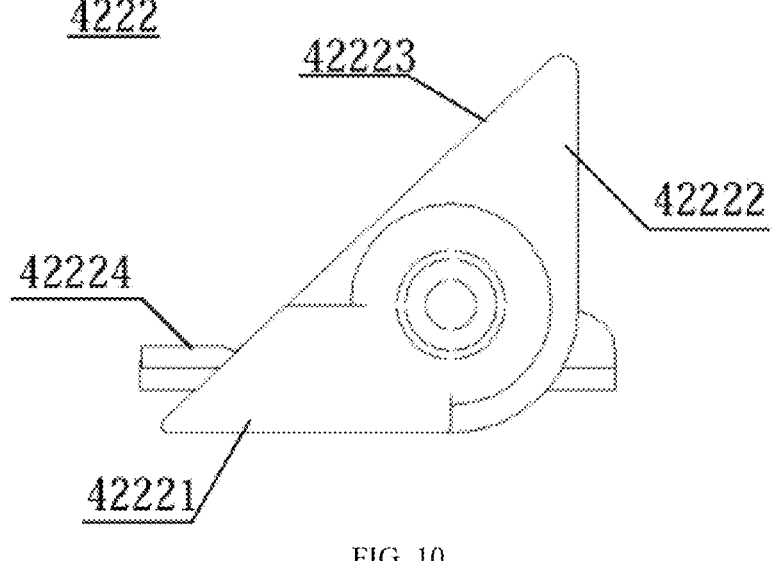
FIG. 10 schematically shows a structural diagram of a deflector head according to the embodiments of the present disclosure.
Figure 11:
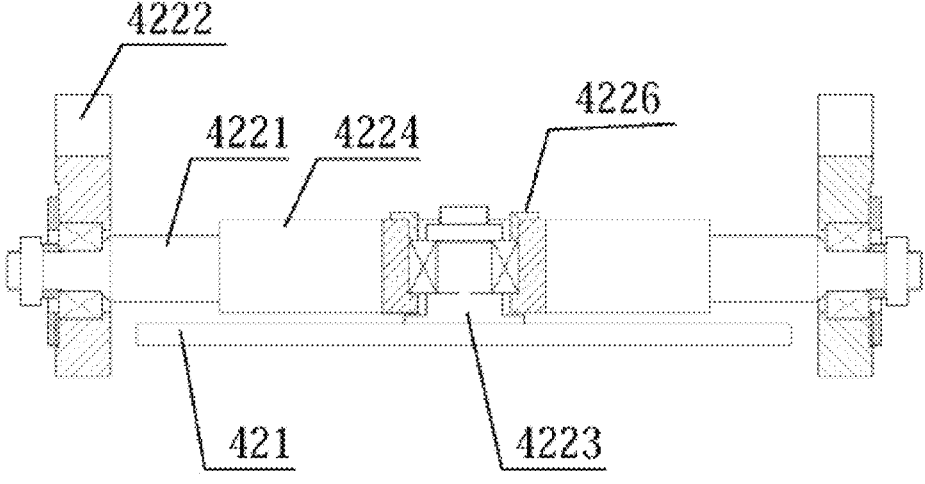
FIG. 11 schematically shows a sectional view at C-C in FIG. 7.
Figure 12:
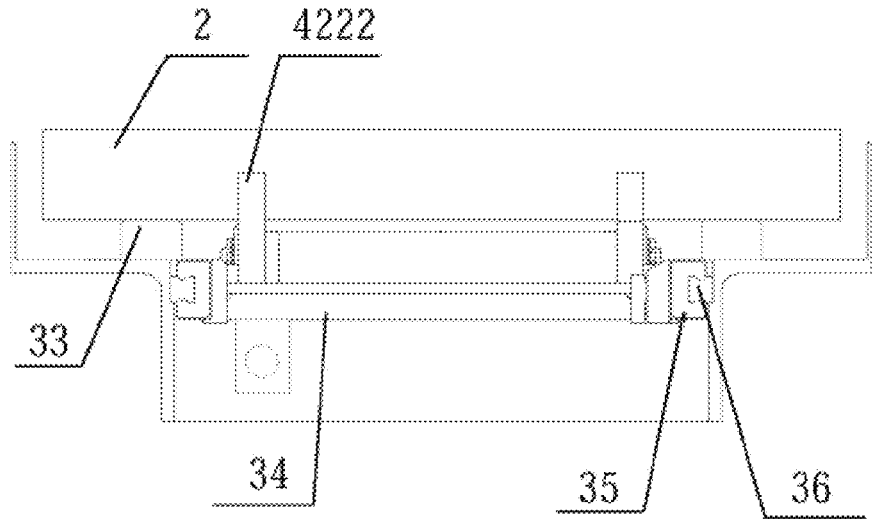
FIG. 12 schematically shows a side view of a first transmission mechanism according to the embodiments of the present disclosure.

As shown in FIG. 3, the rack 421 is a square frame structure, and two opposite frame sides of the rack 421 are respectively provided with a chute 36. A second slide rail 35 is installed on an inner side surface of a vertical wall of the supporting structure 41. The chute 36 may be slidably arranged on the second slide rail 35. Under a driving of an external force, the movement of the rack 421 in the X direction with respect to the supporting structure 41 is realized.

It may be understood that the driving of the external force may be manual drive, electric drive, hydraulic drive, pneumatic drive, etc.

Figure 2:
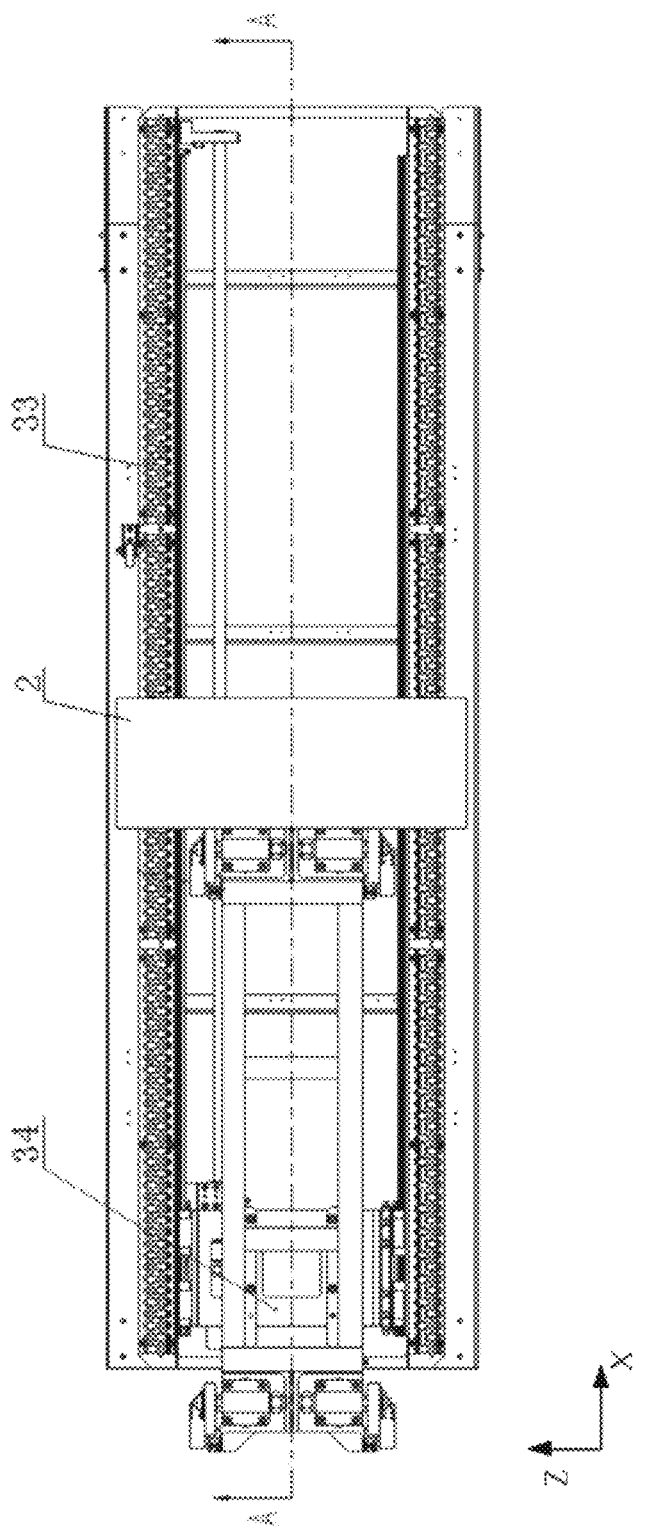
FIG. 2 schematically shows a top view of a first transmission mechanism according to the embodiments of the present disclosure.

Optionally, in the embodiments of the present disclosure, as shown in FIG. 2 and FIG. 3, two first slide rail 33 and two second slide rail 35 are provided, and they are respectively arranged on two sides of the sliding mechanism 34. A moving stability of the sliding mechanism 34 as well as the detected object 2 may be increased by a multi-point supporting. However, it should be understood that the number of the first slide rails 33 and the second slide rails 35 in the embodiments of the present disclosure is not limited to this, and the present disclosure may also include a case where a plurality of first slide rails 33 and/or a plurality of second slide rails 35 are provided.

In some exemplary embodiments, a driving device 31 includes a servo motor. The servo motor may convert a voltage signal into torque and speed to drive a controlled object. A rotor speed of the servo motor is controlled by an input signal and may respond quickly. In an automatic control system, a received electrical signal may be converted into an angular displacement or angular speed output on a motor shaft whose position control is very precise. One end of the lead screw 32 is connected with an output end of the servo motor, and the other end of the lead screw 32 is connected with the rack 421, so that the lead screw 32 may rotate with respect to the rack 421 with the central axis of the lead screw 32 as the rotating shaft 4223.

Forward and reverse rotation of the servo motor may drive the lead screw 32 to drive the sliding mechanism 34 to move reciprocally along the second slide rail 35, so as to realize a transmission of the detected objects 2 in batches.

In the embodiments of the present disclosure, the sliding mechanism 34 is provided with at least one first adjustment assembly 42. When the sliding mechanism 34 moves in the extension direction of the lead screw 32, the first adjustment assembly 42 may move along with the sliding mechanism 34 while pushing the detected object 2 to move on the first slide rail 33.

In addition, a distance between a joint of the sliding mechanism 34 and the lead screw 32 and the first adjustment assembly 42 should not be less than a length of the supporting structure 41, so that after the detected object 2 is transmitted from the first slide rail 33 to the supporting structure 41, an end of a pushing assembly arranged on the sliding mechanism 34 may extend beyond the second slide rail 35 so as to continue to push the detected object 2 to slide on the supporting structure 41 until the detected object 2 passes through the scanning region 62 of the imaging system 6, and finally transmitted from an outlet side of the imaging system 6, as shown in FIG. 13.

Figure 14:
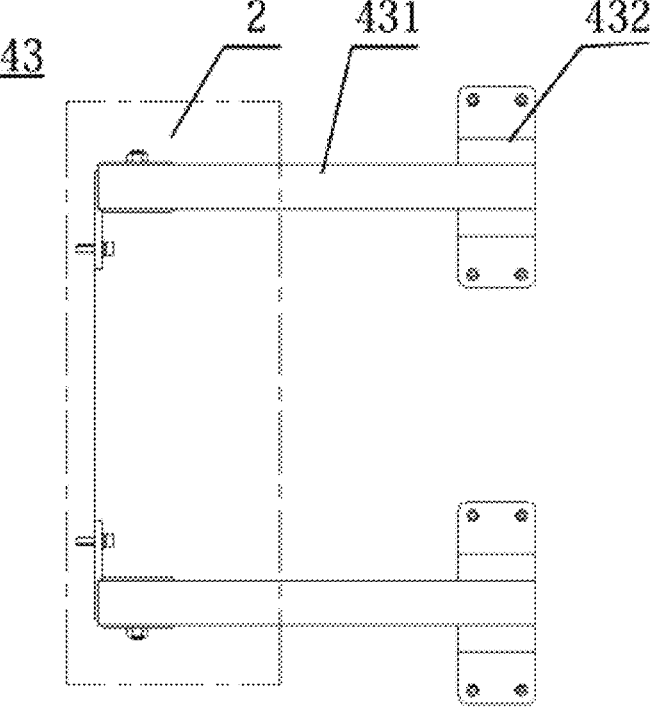
FIG. 14 schematically shows a top view of a second adjustment assembly according to the embodiments of the present disclosure.
Figure 18:
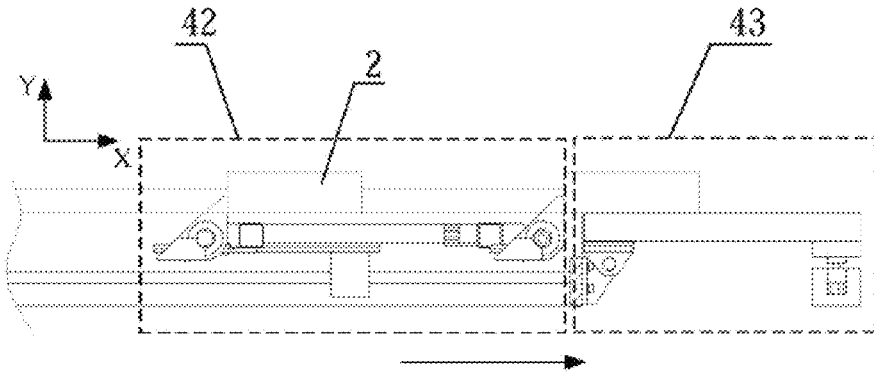
FIG. 18 schematically shows a front view of a posture adjustment structure according to the embodiments of the present disclosure.
Figure 19:
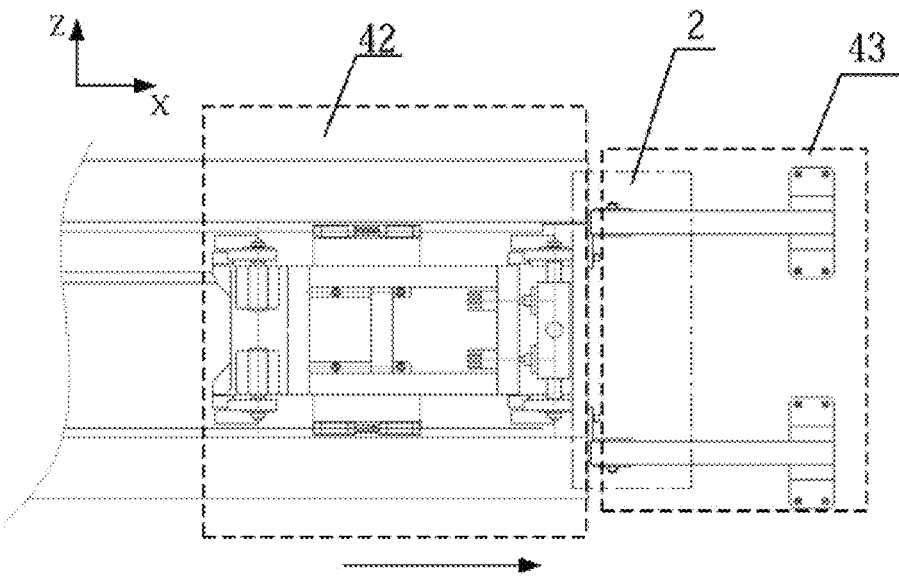
FIG. 19 schematically shows a top view of a posture adjustment structure according to the embodiments of the present disclosure.

Referring to FIG. 14, FIG. 18, and FIG. 19, the second adjustment assembly 43 is arranged on the supporting structure 41. The second adjustment assembly 43 includes: a supporting plate 431 which is rotatably arranged on the supporting structure 41 with the Z-axis as a rotation axis, and is suitable for receiving the detected object 2. The supporting plate 431 in the embodiments of the present disclosure is a supporting beam structure. In order to achieve a stable support for the detected object 2, the number of the supporting plates 431 is two, and the two supporting plates are respectively hinged on the supporting structure 41. The horizontal supporting arms of the two frame bodies of the supporting structure 41 are respectively and correspondingly provided with hinged seats 433 so as to realize a connection with the supporting plate 431.

One end of the supporting plate 431 close to the first adjustment assembly 42 is hinged on the supporting structure 41. In addition, in order to ensure that the detected object 2 moves smoothly from the first adjustment assembly 42 to the second adjustment assembly 43, it may be controlled that a height of the bearing surface 411 is higher than an upper surface of the supporting plate 431 in the Y direction.

In order to drive the supporting plate 431 to rotate, the second adjustment assembly 43 further includes: a second driving unit 432 arranged on the supporting structure 41 and is arranged at a lower portion of the supporting plate 431 away from a hinged end, and the second driving unit is used to drive the supporting plate 431 to rotate.

Figure 15:
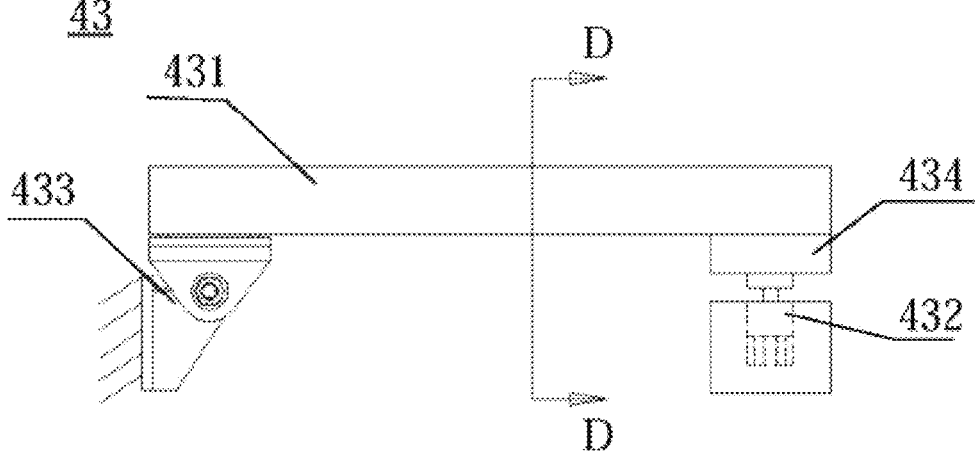
FIG. 15 schematically shows a front view of a second adjustment assembly according to the embodiments of the present disclosure.
Figure 16:
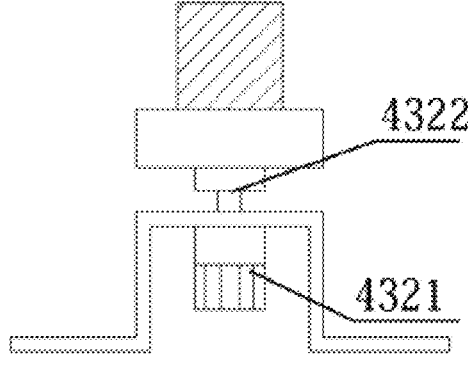
FIG. 16 schematically shows a sectional view at D-D in FIG. 15.
Figure 17:
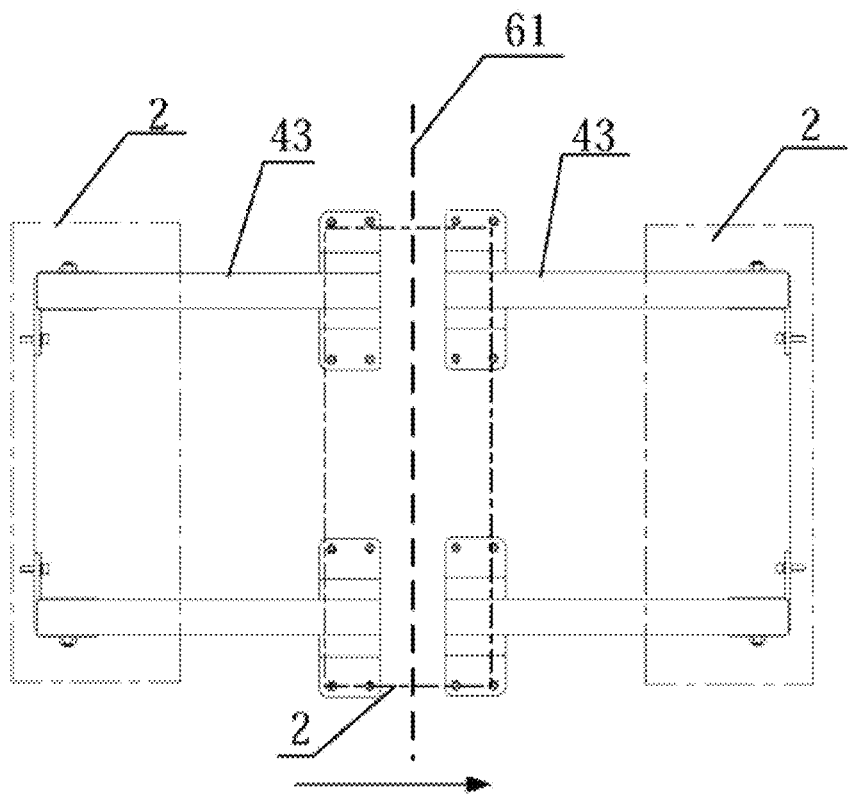
FIG. 17 schematically shows a top view of another implementation of a second adjustment assembly according to the embodiments of the present disclosure.

As shown in FIG. 15 and FIG. 16, the second driving unit 432 includes: a second motor 4321 arranged on the supporting structure 41; a lifting rod 4322 arranged on a motor shaft of the second motor 4321. One end of the lifting rod 4322 is connected to the supporting plate 431, and the second motor 4321 drives the lifting rod 4322 to rotate through a coupling. One end of the lifting rod 4322 is connected to a joint 434 arranged on a lower end surface of the supporting plate 431, and the lifting rod 4322 may be screwed to the joint 434. With a positive rotation and a reverse rotation of the second motor 4321, a positive rotation and a reverse rotation of the lifting rod 4322 may be achieved, thereby driving the supporting plate 431 to rotate clockwise or counterclockwise around the hinged shaft.

It may be understood that driving forms of the second driving unit 432 may be various. In some embodiments, common motor drive and cylinder telescopic drive may be adopted.

The detected object 2 placed on the bearing surface 411 is driven by the deflector head 4222 under the action of the deflector rod 4221 of the first adjustment assembly 42 to complete the deflection adjustment in the Y direction, then driven by the rack 421 to complete the movement in the X direction through the pushing of the deflector head 4222, and then enters the second adjustment assembly 43. Driven by the supporting plate 431 in the second adjustment assembly 43, a deflection adjustment in the Z direction is completed, thus completing the posture adjustment of the detected object 2, and entering the next radiation imaging process.

It should be noted here that the ray in the radiation imaging is easy to attenuate when penetrating a metal object, thus the supporting plate 431 and other structures in the second adjustment assembly 43 in the embodiment are preferably made of carbon fiber materials.

It should be noted that the inventor found in the actual production that a stiffness of the supporting plate made of carbon fiber is average. After being used multiple times, the supporting plate 431 is prone to bending deformation. When different types of detected objects 2 are placed on the supporting plate 431, a degree of the bending deformation of the supporting plate 431 is different due to a weight change of the detected object 2, thus a rotation angle of the supporting plate 431 is required to be adjusted each time, increasing the operation processes. Based on this, another implementation of the second adjustment assembly 43 is provided in the present disclosure.

The two sets of second adjustment assemblies 43 are arranged at an interval in the X direction. During the radiation imaging, the scanning region 62 of radiation imaging is just within an interval region of the interval arrangement. Such arrangement ensures that the supporting plate 431 will not cause the ray to attenuate while using metals having better stiffness.

In the embodiments of the present disclosure, the transmission system for the detection apparatus may further include a second transmission mechanism 5. The second transmission mechanism 5 is arranged on the outlet side of the imaging system 6 and is in mating connection with the supporting structure 41. The second transmission mechanism 5 is used to transmit the detected object 2 from the supporting structure 41. After passing the detection of the imaging system 6, the detected object 2 is transmitted to a waiting region through the second transmission mechanism 5, waiting for subsequent processes. Meanwhile, by providing the second transmission mechanism 5, the detected object 2 may be transmitted to a position away from the imaging system 6 so as to avoid an influence of radiation when the detected object 2 is taken out.

It should be noted that a connection relationship between the supporting structure 41 and the second transmission mechanism 5 is similar to a connection relationship between the first transmission mechanism 3 and the supporting structure 41, and the connection relationship between the first transmission mechanism 3 and the supporting structure 41 has been described in detail above, and will not be repeated here.

Optionally, in the embodiments of the present disclosure, a transmission manner of the second transmission mechanism 5 includes non-power transmission. That is, after the detected object 2 is transmitted to the second transmission mechanism 5 by the supporting structure 41, the detected object 2 may slide along the second transmission mechanism 5 under its own gravity to realize the transmission of the detected object 2. A transmission cost of the non-power transmission manner is low, and a normal transmission of the detected object 2 may be ensured.

For example, the second transmission mechanism 5 may be a non-power roller transmission platform arranged in an inclined manner and is provided with a plurality of freely rotating rollers. After the detected object 2 is transmitted from the supporting structure 41 to the roller transmission platform, the detected object 2 may slide to a bottom of the roller transmission platform by using the rollers on the roller transmission platform to complete a transmission process of the detected object 2.

Optionally, in the embodiments of the present disclosure, the transmission manner of the second transmission mechanism 5 may further include a power transmission manner. A transmission distance of power transmission manner is longer, and the transmission process is more stable and the transmission efficiency is higher. For example, the transmission manner of the second transmission mechanism 5 may be belt transmission, power roller transmission, synchronous belt transmission or lead screw 32 transmission, or the like.

In the embodiments of the present disclosure, both the inlet side and the outlet side of the imaging system 6 are provided with a protective cover 11 used to shield the radiation ray of the imaging system 6. In addition, the protective cover 11 is arranged outside the first transmission mechanism 3, the supporting structure 41 and the second transmission mechanism 5, which may isolate the radiation of scanning detection rays to a large extent, thus having a good radiation protection effect.

Further, in the embodiments of the present disclosure, the protective cover 11 is formed by bending a sheet metal, and an outer surface of the protective cover 11 is provided with a lead layer, which may enhance the radiation shielding effect.

A working principle of the transmission system for the detection apparatus in the embodiments of the present disclosure is that: the first transmission mechanism 3, the supporting structure 41 and the second transmission mechanism 5 are all provided inside the protective cover 11, which may weaken the ray radiation of the imaging system 6. In the first transmission mechanism 3, the servo motor drives the lead screw 32 to drive the sliding mechanism 34 to move along the second slide rail 35. The first adjustment assembly 42 is installed on the sliding mechanism 34, and the first adjustment assembly pushes the detected object 2 to move on the first slide rail 33 to the supporting structure 41, and slide along the supporting structure 41 to the scanning region 62 of the imaging system 6, for being detected by the imaging system 6. After the detection of the detected object 2 is completed, the detected object 2 moves out of the protective cover 11 along the second transmission mechanism 5.

It should be noted that the transmission system for the detection apparatus in the embodiments of the present disclosure is suitable for use in the field of security inspection, especially for detecting some products with high requirements for image detection qualities. For example, ultra-thin layers such as the adhesive layer and the thin film layer of the battery may be accurately positioned to obtain high-quality detection images. It should be understood that the detection object of the transmission system in the embodiments of the present disclosure is not limited to the field of battery.

Figure 23:
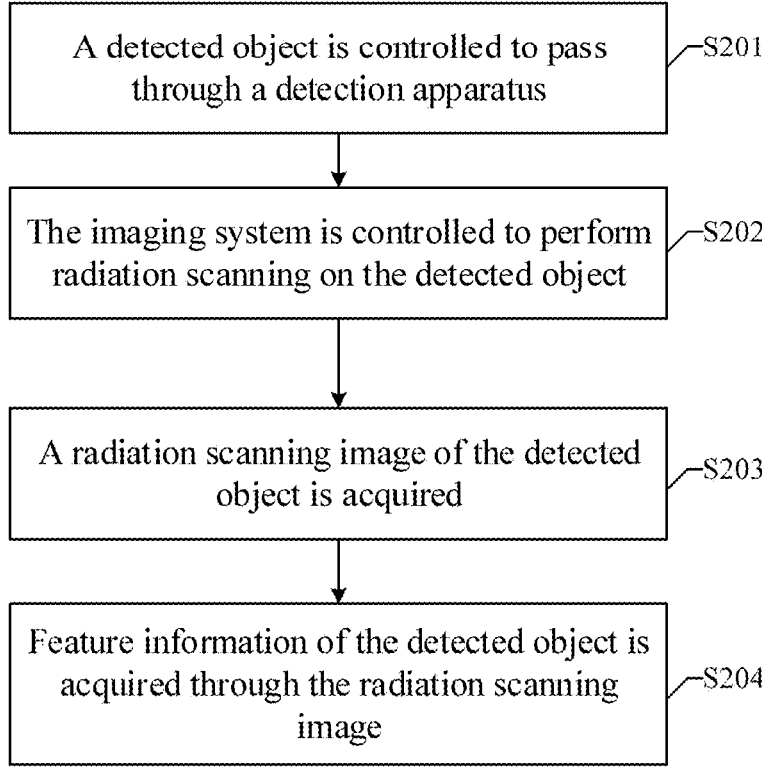
FIG. 23 is a flowchart of a method of acquiring feature information of a detected object according to the embodiments of the present disclosure.

According to another aspect, the embodiments of the present disclosure provide a method of acquiring feature information of a detected object. As shown in FIG. 23. The method may include the following steps.

In step S201, a detected object is controlled to pass through a detection apparatus, wherein the detection apparatus is used to scan and detect the detected object, and the detection apparatus includes: a detection channel and an imaging system, wherein the detected object enters and exits the detection apparatus through a detection channel in a first direction and the imaging system is used to scan and detect the detected object.

In step S202, the imaging system is controlled to perform radiation scanning on the detected object.

In step S203, a radiation scanning image of the detected object is acquired.

In step S204, feature information of the detected object is acquired through the radiation scanning image.

For example, the detected object 2 includes a first part 2A, a detection part 2B and a second part 2C. In a process of controlling the imaging system to perform radiation scanning on the detected object, the detection part is located between the first part and the second part in the first direction.

In the embodiments of the present disclosure, the detected object 2 may be controlled to be positioned in a scanning region, and after a slice of interest region reaches the scanning region, the imaging system may be controlled to collect data on the slice of interest. A manner of data collection may be: complete circular orbit data is collected when the object is stationary, or complete spiral orbit data is collected when the object moves slowly. After the collection of the slice of interest is completed, data reconstruction is performed. A posture adjustment structure may quickly adjust the detected object 2 to a next slice of interest. After the next slice of interest reaches the scanning region, the imaging system performs data acquisition on the next slice of interest. In this way, a whole scanning process of all slices of interest of the detected object 2 is completed. Therefore, in the embodiments of the present disclosure, it is possible to achieve a high-resolution inspection of the slices of interest while ensuring the detection efficiency. In addition, devices of the imaging system may be adjusted adaptively according to specific conditions of the detected object, thus having more options in flexibility.

In the embodiments of the present disclosure, the posture of the detected object may be obtained first, and then the posture of the detected object may be adjusted automatically to realize a process of automatically positioning and scanning the thin layer. Specifically, the imaging system 6 may be used to scan the detected object 2 to obtain a first image of the detected object 2. By analyzing the first image, the posture of the detected object 2 may be obtained. Based on the acquired posture of the detected object 2, the posture adjustment structure may be controlled to adjust the posture of the detected object 2, so that the detected surface of the detected object 2 is in the same plane as the main beam surface of the imaging system 6. Then, the imaging system 6 is controlled to perform radiation scanning on the detected object 2 to obtain a second image of the detected object 2. For example, the second image may be a slice image of the detected object 2.

In some embodiments, an additional imaging system may be used to scan the detected object 2 to obtain the first image of the detected object 2. For example, the additional imaging system may be a CT imaging system, a DR imaging system, or a visible light imaging system.

Figure 22:
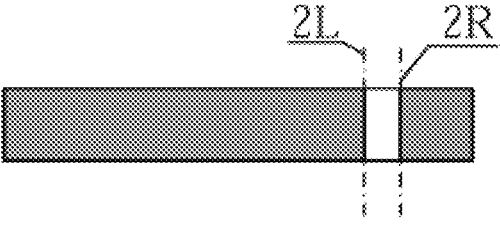
FIG. 22 schematically shows a schematic diagram of a radiation imaging image generated by a detection apparatus according to some exemplary embodiments of the present disclosure.

For example, with reference to FIG. 22, acquiring feature information of the detected object through the radiation scanning image includes: a first boundary line 2L between the detection part and the first part and a second boundary line 2R between the detection part and the second part are acquired through the radiation scanning image; and a dimension between the first boundary line 2L and the second boundary line 2R in the first direction is calculated to acquire a dimension of the detection part in the first direction.

According to some exemplary embodiments, the method further includes: a volume of the detection part is acquired.

The acquiring feature information of the detected object through the radiation scanning image further includes: an area of a projection of the detection part in the first direction is acquired based on the volume of the detection part and the dimension of the detection part in the first direction.

According to some exemplary embodiments, the method further includes: shape feature information of the projection of the detection part in the first direction is acquired.

The acquiring feature information of the detected object through the radiation scanning image further includes: feature information of a section of the detection part perpendicular to the first direction is acquired based on the area of the projection of the detection part in the first direction and the shape feature information of the projection of the detection part in the first direction.

According to some exemplary embodiments, an attenuation characteristic of each of the first part and the second part to the ray emitted by the imaging system is different from an attenuation characteristic of the detection part to the ray emitted by the imaging system.

According to some exemplary embodiments, in the radiation scanning image, a gray level of each of the first part and the second part is different from a gray level of the detection part. The acquiring a first boundary line between the detection part and the first part and a second boundary line between the detection part and the second part through the radiation scanning image includes: the first boundary line is determined according to a difference of the gray levels of the detection part and the first part shown in the radiation scanning image; and the second boundary line is determined according to a difference of the gray levels of the detection part and the second part shown in the radiation scanning image.

For example, a shape of the projection of the detection part in the first direction is circular, and the acquiring feature information of a section of the detection part perpendicular to the first direction based on the area of the projection of the detection part in the first direction and the shape feature information of the projection of the detection part in the first direction includes: a radius of the section of the detection part perpendicular to the first direction is acquired by using an area calculation formula of a circle according to the area of the projection of the detection part in the first direction.

For example, a shape of the projection of the detection part in the first direction is square, and the acquiring feature information of a section of the detection part perpendicular to the first direction based on the area of the projection of the detection part in the first direction and the shape feature information of the projection of the detection part in the first direction includes: a side length of the section of the detection part perpendicular to the first direction is acquired by using an area calculation formula of a square according to the area of the projection of the detection part in the first direction.

According to some exemplary embodiments, the detection apparatus further includes a posture adjustment structure arranged in the detection channel to adjust a posture of the detected object in the detection channel.

The controlling the imaging system to perform radiation scanning on the detected object includes: the detected object is controlled to move in the first direction in the detection channel under a driving of the posture adjustment structure; and the imaging system is controlled to continuously emit beam to continuously perform radiation scanning on the detected object during a moving process of the detected object.

According to some exemplary embodiments, the imaging system includes a ray source for generating a ray, the ray source is arranged on a side of the detection channel, and the ray at least forms a main beam surface suitable for scanning and detecting the detected object.

The controlling the imaging system to perform radiation scanning on the detected object further includes: the posture of the detected object is adjusted so that in the process of radiation scanning, the detected surface of the detected object is in the same plane as the main beam surface.

For example, a ratio of an area value of the projection of the detection part in the first direction to a dimension value of the detection part in the first direction is greater than or equal to 10.

For example, a ratio of a dimension of the detector in the first direction to the dimension of the detection part in the first direction is within a range of 1 to 8.

Figure 24:
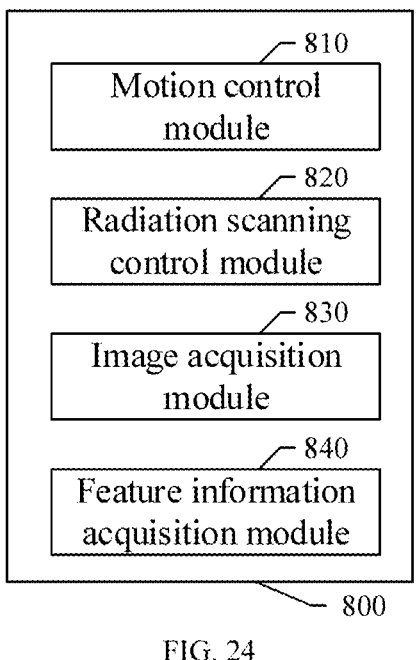
FIG. 24 schematically shows a structure block diagram of a device of acquiring feature information of a detected object according to the embodiments of the present disclosure.

FIG. 24 schematically shows a structural block diagram of a device of acquiring feature information of a detected object according to the embodiments of the present disclosure. The device 800 of acquiring feature information of the detected object includes a motion control module 810, a radiation scanning control module 820, an image acquisition module 830, and a feature information acquisition module 840.

The motion control module 810 is used to control the detected object to pass through a detection apparatus, wherein the detection apparatus is used to scan and detect the detected object. The detection apparatus includes: a detection channel and an imaging system, wherein the detected object enters and exits the detection apparatus through the detection apparatus in a first direction, and the imaging system is used to scan and detect the detected object.

The radiation scanning control module 820 is used to control the imaging system to perform radiation scanning on the detected object.

The image acquisition module 830 is used to acquire a radiation scanning image of the detected object.

The feature information acquisition module 840 is used to acquire feature information of the detected object through the radiation scanning image, wherein the detected object includes a first part, a detection part and a second part. In a process of controlling the imaging system to perform radiation scanning on the detected object, the detection part is located between the first part and the second part in the first direction. The acquiring feature information of the detected object through the radiation scanning image includes: acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

According to the embodiments of the present disclosure, any of the motion control module 810, the radiation scanning control module 820, the image acquisition module 830 and the feature information acquisition module 840 may be combined in one module for implementation, or any one of the modules may be divided into a plurality of modules. Alternatively, at least partial functions of one or more of the modules may be combined with at least partial functions of other modules and implemented in one module. According to the embodiments of the present disclosure, at least one of the motion control module 810, the radiation scanning control module 820, the image acquisition module 830 and the feature information acquisition module 840 may be implemented at least partially as a hardware circuit, such as a field programmable gate array (FPGA), a programmable logic array (PLA), a system on a chip, a system on a substrate, a system on a package or an application specific integrated circuit (ASIC), or may be implemented by any other reasonable means of hardware or firmware that integrates or packages a circuit, or may be implemented in any one of three implementation methods of software, hardware, and firmware or a suitable combination thereof. Alternatively, at least one of the motion control module 810, the radiation scanning control module 820, the image acquisition module 830 and the feature information acquisition module 840 may be implemented at least partially as a computer program module which, when being executed, may perform a corresponding function.

Figure 25:
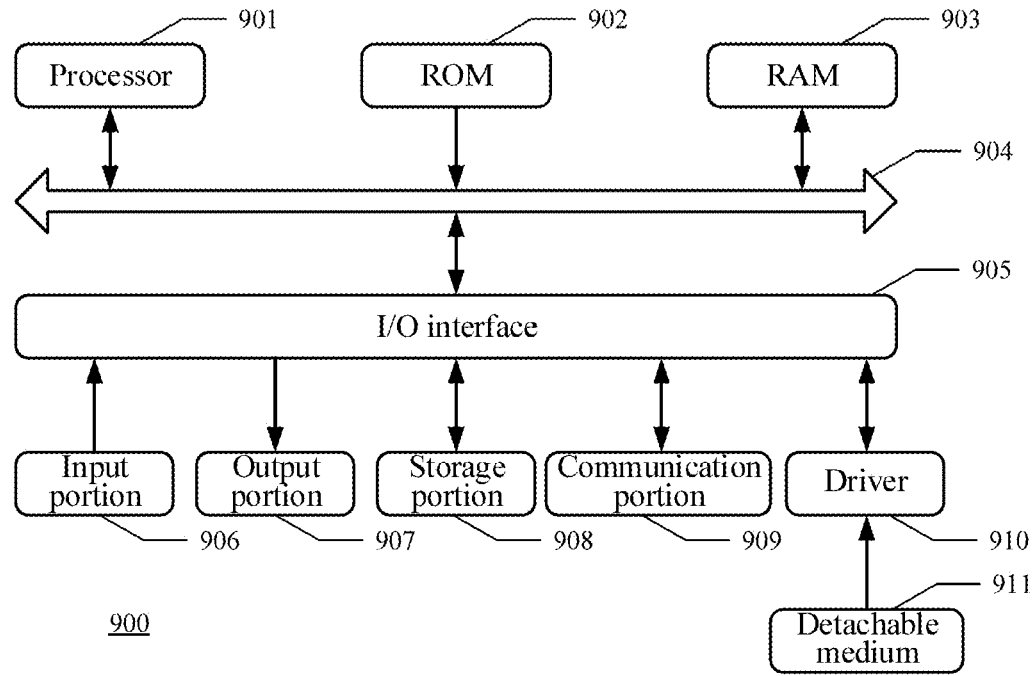
FIG. 25 schematically shows a block diagram of an electronic apparatus suitable for realizing a method of acquiring feature information of a detected object according to the embodiments of the present disclosure.

FIG. 25 schematically shows a block diagram of an electronic apparatus suitable for realizing a method of acquiring feature information of a detected object according to the embodiments of the present disclosure.

As shown in FIG. 25, the electronic apparatus 900 according to the embodiments of the present disclosure includes a processor 901 that may perform various appropriate actions and processing according to programs stored in a read-only memory (ROM) 902 or programs loaded from a storage portion 908 into a random access memory (RAM) 903. The processor 901 may include, for example, a general-purpose microprocessor (e.g., a CPU), an instruction set processor and/or a related chipset and/or a special-purpose microprocessor (e.g., an application-specific integrated circuit (ASIC)), etc. The processor 901 may also include an on-board memory for caching purposes. The processor 901 may include a single processing unit or a plurality of processing units for performing different actions of a method flow according to the embodiments of the present disclosure.

Various programs and data required for operations of the electronic apparatus 900 are stored in the RAM 903. The processor 901, the ROM 902 and the RAM 903 are connected to each other through a bus 904. The processor 901 performs various operations of the method flow according to the embodiments of the present disclosure by executing the programs in the ROM 902 and/or the RAM 903. It should be noted that the programs may also be stored in one or more memories other than the ROM 902 and the RAM 903. The processor 901 may also perform the various operations of the method flow according to the embodiments of the present disclosure by executing the programs stored in the one or more memories.

According to the embodiments of the present disclosure, the electronic apparatus 900 may also include an input/output (I/O) interface 905, and the input/output (I/O) interface 905 is also connected to the bus 904. The electronic apparatus 900 may also include one or more of the following components connected to the I/O interface 905: an input portion 906 including a keyboard, a mouse, etc.; an output portion 907 including a cathode ray tube (CRT), a liquid crystal display (LCD), etc., and a speaker, etc.; a storage portion 908 including a hard disk, etc.; and a communication portion 909 including a network interface card such as a LAN card, a modem, etc. The communication portion 909 performs communication processing via a network such as the Internet. A driver 910 is also connected to the I/O interface 905 as required. A detachable medium 911, such as a magnetic disk, an optical disk, a magneto-optical disk, a semiconductor memory, etc., is mounted on the drive 910 as required, which is convenient for a computer program read therefrom to be installed into the storage portion 908 as required.

The present disclosure further provides a computer-readable storage medium. The computer-readable storage medium may be included in the apparatus/device/system described in the above-mentioned embodiments, and may also exist alone without being assembled into the apparatus/device/system. The computer-readable storage medium described above carries one or more programs, and when the one or more programs are executed, the method according to the embodiments of the present disclosure is realized.

According to the embodiments of the present disclosure, the computer-readable storage medium may be a nonvolatile computer-readable storage medium, including but is not limited to: a portable computer disk, a hard disk, a random access memory (RAM), a read only memory (ROM), an erasable programmable read only memory (EPROM or flash memory), a portable compact disk read only memory (CD-ROM), an optical storage device, a magnetic storage device, or any suitable combination thereof. In the present disclosure, the computer-readable storage medium may be any tangible medium that includes or stores a program that may be used by or in conjunction with an instruction execution system, apparatus or device. For example, according to the embodiments of the present disclosure, the computer-readable storage medium may include one or more memories other than the ROM 902 and/or the RAM 903 and/or the ROM 902 and the RAM 903 described above.

The embodiments of the present disclosure further include a computer program product, including computer programs, and the computer programs include program codes for executing the method shown in the flow chart. When the computer program product is operating in a computer system, the program codes are used for the computer system to implement the method provided by the embodiments of the present disclosure.

The computer programs, when being executed by the processor 901, execute the above-mentioned functions defined in the system/device of the embodiments of the present disclosure. According to the embodiments of the present disclosure, the system, device, module, unit, etc., described above may be implemented by a computer program module.

In an embodiment, the computer programs may be hosted on a tangible storage medium such as an optical storage device, a magnetic storage device, and the like. In another embodiment, the computer programs may also be transmitted and distributed in a form of signals on a network medium, downloaded via the communication portion 909 and installed, and/or installed from the removable medium 911. The program codes included in the computer program may be transmitted by any appropriate network medium, including but is not limited to: wireless, wired, etc., or any suitable combination of the above.

In such an embodiment, the computer programs may be downloaded from the network via the communication portion 909 and installed, and/or installed from the removable medium 911. The computer programs, when being executed by the processor 901, perform the above-mentioned functions defined in the system of the embodiments of the present disclosure. According to the embodiments of the present disclosure, the system, apparatus, device, module, unit, etc. described above may be implemented by the computer program module.

The embodiments of the present disclosure have been described above. However, these embodiments are for illustrative purposes only, and are not intended to limit the scope of the present disclosure. Although various embodiments have been described above separately, this does not mean that the measures in various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of acquiring a feature information of a detected object, comprising:

controlling the detected object to pass through a detection apparatus, wherein the detection apparatus is configured to scan and detect the detected object; and the detection apparatus comprises: a detection channel and an imaging system, the detected object enters and exits the detection apparatus through the detection channel in a first direction, and the imaging system is configured to scan and detect the detected object;

controlling the imaging system to perform radiation scanning on the detected object;

acquiring a radiation scanning image of the detected object;

acquiring a feature information of the detected object through the radiation scanning image, wherein the detected object comprises a first part, a detection part and a second part, and in a process of controlling the imaging system to perform radiation scanning on the detected object, the detection part is located between the first part and the second part in the first direction, and wherein the acquiring a feature information of the detected object through the radiation scanning image comprises:

acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

2. The method according to claim 1, further comprising: acquiring a volume of the detection part, wherein the acquiring a feature information of the detected object through the radiation scanning image further comprises:

acquiring an area of a projection of the detection part in the first direction based on the volume of the detection part and the dimension of the detection part in the first direction.

3. The method according to claim 2, further comprising: acquiring a shape feature information of the projection of the detection part in the first direction;

wherein the acquiring a feature information of the detected object through the radiation scanning image further comprises:

acquiring a feature information of a section of the detection part perpendicular to the first direction based on the area of the projection of the detection part in the first direction and the shape feature information of the projection of the detection part in the first direction.

4. The method according to claim 3, wherein a shape of the projection of the detection part in the first direction is circular, and the acquiring a feature information of a section of the detection part perpendicular to the first direction based on the area of the projection of the detection part in the first direction and the shape feature information of the projection of the detection part in the first direction comprises: acquiring a radius of the section of the detection part perpendicular to the first direction by using an area calculation formula of a circle according to the area of the projection of the detection part in the first direction; or a shape of the projection of the detection part in the first direction is square, and the acquiring a feature information of a section of the detection part perpendicular to the first direction based on the area of the projection of the detection part in the first direction and the shape feature information of the projection of the detection part in the first direction comprises: acquiring a side length of the section of the detection part perpendicular to the first direction by using an area calculation formula of a square according to the area of the projection of the detection part in the first direction.

5. The method according to claim 1, wherein an attenuation characteristic of each of the first part and the second part to a ray emitted by the imaging system is different from an attenuation characteristic of the detection part to the ray emitted by the imaging system.

6. The method according to claim 5, wherein in the radiation scanning image, a gray level of each of the first part and the second part is different from a gray level of the detection part, and wherein the acquiring a first boundary line between the detection part and the first part and a second boundary line between the detection part and the second part through the radiation scanning image comprises:

determining the first boundary line according to a difference of the gray levels of the detection part and the first part shown in the radiation scanning image; and determining the second boundary line according to a difference of the gray levels of the detection part and the second part shown in the radiation scanning image.

7. The method according to claims 1, wherein the detection apparatus further comprises a posture adjustment structure arranged in the detection channel to adjust a posture of the detected object in the detection channel;

wherein the controlling the imaging system to perform radiation scanning on the detected object comprises:

controlling the detected object to move in the first direction in the detection channel under a driving of the posture adjustment structure; and controlling the imaging system to continuously emit a beam to continuously perform radiation scanning on the detected object during a moving process of the detected object.

8. The method according to claims 1, wherein the imaging system comprises a ray source for generating a ray, the ray source is arranged on a side of the detection channel, and the ray at least forms a main beam surface suitable for scanning and detecting the detected object, and wherein the controlling the imaging system to perform radiation scanning on the detected object further comprises:

adjusting a posture of the detected object so that: in a process of radiation scanning, a detected surface of the detected object is in a same plane as the main beam surface.

9. The method according to claim 8, wherein before the controlling the imaging system to perform radiation scanning on the detected object, the method further comprises:

obtaining a posture of the detected object; and controlling a posture adjustment structure to adjust the posture of the detected object based on the obtained posture of the detected object, so that a detected surface of the detected object is in a same plane as the main beam surface of the imaging system.

10. The method according to claim 9, wherein the obtaining a posture of the detected object comprises:

scanning the detected object by using the imaging system or an additional imaging system to obtain a first image of the detected object; and obtaining the posture of the detected object by analyzing the first image.

11. The method according to claims 1, wherein a ratio of an area value of the projection of the detection part in the first direction to a dimension value of the detection part in the first direction is greater than or equal to 10.

12. The method according to claims 1, wherein the imaging system comprises a detector configured to scan and detect the detected object, and a ratio of a dimension of the detector in the first direction to the dimension of the detection part in the first direction is within a range of 1 to 8.

13. An electronic apparatus, comprising:

one or more processors;

a storage device configured to store one or more programs, wherein the one or more programs, when being executed by the one or more processors, cause the one or more processors to implement the method according to claim 1.

14. A non-transitory computer-readable storage medium having executable instructions thereon, wherein the instructions, when being executed by a processor, cause the processor to implement the method according to claim 1.

15. A device of acquiring a feature information of a detected object, comprising:

a motion control module configured to control the detected object to pass through a detection apparatus, wherein the detection apparatus is configured to scan and detect the detected object, and the detection apparatus comprises: a detection channel and an imaging system, the detected object enters and exits the detection apparatus through the detection channel in a first direction, and the imaging system is configured to scan and detect the detected object;

a radiation scanning control module configured to control the imaging system to perform radiation scanning on the detected object;

an image acquisition module configured to acquire a radiation scanning image of the detected object; and a feature information acquisition module configured to acquire a feature information of the detected object through the radiation scanning image, wherein the detected object comprises a first part, a detection part and a second part; and in a process of controlling the imaging system to perform radiation scanning on the detected object, the detection part is located between the first part and the second part in the first direction, and wherein the acquiring a feature information of the detected object through the radiation scanning image comprises:

acquiring a first boundary line between the detection part and the first part and a second boundary line between the detection part and the second part through the radiation scanning image; and calculating a dimension between the first boundary line and the second boundary line in the first direction to acquire a dimension of the detection part in the first direction.

* * * * *